United States Patent
Kim et al.

(10) Patent No.: US 10,356,484 B2
(45) Date of Patent: Jul. 16, 2019

(54) DATA TRANSMITTING APPARATUS, DATA RECEIVING APPARATUS, DATA TRANSCEIVING SYSTEM, METHOD FOR TRANSMITTING DATA, AND METHOD FOR RECEIVING DATA

(71) Applicant: SAMSUNG ELECTRONICS CO., LTD., Suwon-si (KR)

(72) Inventors: Jong-hwa Kim, Suwon-si (KR); Kyeong-jae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/213,074

(22) Filed: Mar. 14, 2014

(65) Prior Publication Data

US 2014/0282706 A1 Sep. 18, 2014

Related U.S. Application Data

(60) Provisional application No. 61/802,807, filed on Mar. 18, 2013, provisional application No. 61/789,803, filed on Mar. 15, 2013.

(30) Foreign Application Priority Data

Mar. 4, 2014 (KR) ........................ 10-2014-0025653

(51) Int. Cl.
*H04N 21/81* (2011.01)
*H04N 21/233* (2011.01)
(Continued)

(52) U.S. Cl.
CPC ..... *H04N 21/8106* (2013.01); *H04L 65/4084* (2013.01); *H04L 65/602* (2013.01);
(Continued)

(58) Field of Classification Search
CPC ............. H04N 13/0059; H04N 21/233; H04N 21/23614; H04N 21/4348; H04N 21/439;
(Continued)

(56) References Cited

U.S. PATENT DOCUMENTS 5,463,565 A * 10/1995 Cookson ................ G11B 19/02
348/500
7,735,111 B2 6/2010 Michener et al.
(Continued)

FOREIGN PATENT DOCUMENTS

CN 1885724 A 12/2006
CN 101325701 A 12/2008
(Continued)

OTHER PUBLICATIONS

Communication dated Jul. 3, 2014 issued by the European Patent Office in counterpart European Patent Application No. 14160082.5.
(Continued)

*Primary Examiner* — Junior O Mendoza
*Assistant Examiner* — Susan X Li
(74) *Attorney, Agent, or Firm* — Sughrue Mion, PLLC

(57) ABSTRACT

A data transmitting apparatus is provided. The data transmitting apparatus includes a packet generator configured to generate a packet including a first sub packet and a second sub packet, and a transmitter configured to transmit the generated packet to a data receiving apparatus, and the first sub packet and the second sub packet include different audio data related to a first content.

19 Claims, 31 Drawing Sheets

(51) Int. Cl.

| | |
|---|---|
| H04N 21/236 | (2011.01) |
| H04N 21/439 | (2011.01) |
| H04N 21/434 | (2011.01) |
| H04S 5/00 | (2006.01) |
| H04N 13/194 | (2018.01) |
| H04N 5/60 | (2006.01) |
| H04N 21/4363 | (2011.01) |
| H04N 13/161 | (2018.01) |
| H04L 29/06 | (2006.01) |

(52) U.S. Cl.
CPC ......... *H04L 65/607* (2013.01); *H04N 5/607* (2013.01); *H04N 13/161* (2018.05); *H04N 13/194* (2018.05); *H04N 21/233* (2013.01); *H04N 21/23614* (2013.01); *H04N 21/439* (2013.01); *H04N 21/4348* (2013.01); *H04N 21/4363* (2013.01); *H04S 5/005* (2013.01)

(58) Field of Classification Search
CPC ........... H04N 21/8106; H04N 5/4401; H04N 5/44591; H04N 5/45; H04N 5/602; H04S 5/005
See application file for complete search history.

(56) References Cited

U.S. PATENT DOCUMENTS

| | | | |
|---|---|---|---|
| 7,869,891 B2 | 1/2011 | Kim et al. | |
| 8,166,503 B1* | 4/2012 | Rosenberg | H04N 21/23432 725/109 |
| 8,270,641 B1 | 9/2012 | Greenberg | |
| 8,340,496 B2 | 12/2012 | Iwase et al. | |
| 9,787,968 B2 | 10/2017 | Tsukagoshi | |
| 2003/0115601 A1 | 6/2003 | Palazzo et al. | |
| 2003/0179283 A1 | 9/2003 | Seidel et al. | |
| 2005/0036519 A1* | 2/2005 | Balakrishnan et al. | 370/503 |
| 2005/0076136 A1 | 4/2005 | Cho et al. | |
| 2006/0044998 A1* | 3/2006 | Takakuwa | G11B 27/034 369/275.3 |
| 2006/0293902 A1 | 12/2006 | Kim et al. | |
| 2007/0079241 A1 | 4/2007 | Wang et al. | |
| 2007/0130613 A1 | 6/2007 | Choi | |
| 2007/0253677 A1 | 11/2007 | Wang | |
| 2007/0297509 A1* | 12/2007 | Mizobuchi et al. | 375/240.12 |
| 2008/0235586 A1 | 9/2008 | Chou et al. | |
| 2008/0267588 A1 | 10/2008 | Iwase et al. | |
| 2009/0157750 A1 | 6/2009 | Kim et al. | |
| 2009/0154499 A1 | 7/2009 | Yamakage et al. | |
| 2009/0180760 A1 | 7/2009 | Castillo | |
| 2009/0254939 A1 | 10/2009 | Nagashio | |
| 2009/0290600 A1* | 11/2009 | Tatsuta | G10L 19/167 370/476 |
| 2010/0054706 A1 | 3/2010 | McCrossan et al. | |
| 2010/0088406 A1 | 4/2010 | Yu et al. | |
| 2010/0214474 A1 | 8/2010 | Matsunaga et al. | |
| 2010/0215044 A1* | 8/2010 | Lee | G10L 19/167 370/392 |
| 2011/0170614 A1 | 7/2011 | Moriyama et al. | |
| 2011/0292173 A1 | 12/2011 | Tsukagoshi | |
| 2012/0201402 A1 | 8/2012 | Yamada et al. | |
| 2012/0240180 A1 | 9/2012 | Lin | |
| 2012/0274850 A1* | 11/2012 | Hawkins et al. | 348/515 |
| 2012/0327300 A1* | 12/2012 | Hutchings | H04N 21/4307 348/515 |
| 2013/0014193 A1 | 1/2013 | Emura | |
| 2013/0063668 A1 | 3/2013 | Yamashita et al. | |
| 2013/0222690 A1* | 8/2013 | Kim | H04S 3/00 348/462 |
| 2013/0223456 A1* | 8/2013 | Kim | H04L 69/22 370/474 |
| 2014/0118616 A1* | 5/2014 | Oughriss et al. | 348/462 |
| 2015/0195389 A1* | 7/2015 | Kim | H04L 69/22 370/474 |

FOREIGN PATENT DOCUMENTS

| | | |
|---|---|---|
| CN | 101682756 A | 3/2010 |
| CN | 101702777 A | 5/2010 |
| CN | 102160374 A | 8/2011 |
| CN | 102572454 A | 7/2012 |
| CN | 102629997 A | 8/2012 |
| CN | 102763364 A | 10/2012 |
| EP | 2 257 051 A1 | 12/2010 |
| EP | 2276192 A2 | 1/2011 |
| EP | 2 451 196 A1 | 5/2012 |
| EP | 2461607 A1 | 6/2012 |
| EP | 2485478 A2 | 8/2012 |
| JP | 8-331552 A | 12/1996 |
| JP | 9-149399 A | 6/1997 |
| JP | 9-259539 A | 10/1997 |
| JP | 2005-151214 A | 6/2005 |
| JP | 2009253414 A | 10/2009 |
| JP | 2010200087 A | 9/2010 |
| JP | 201 21 031 1 A | 1/2012 |
| JP | 201249934 A | 3/2012 |
| JP | 201260205 A | 3/2012 |
| JP | 2012-133369 A | 7/2012 |
| JP | 2012151688 A1 | 8/2012 |
| JP | 2012253439 A | 12/2012 |
| KR | 10-2005-0047608 A | 5/2005 |
| TW | 200839732 A | 10/2008 |
| WO | 2008/157549 A2 | 12/2008 |
| WO | 2010/050920 A1 | 5/2010 |

OTHER PUBLICATIONS

Communication dated Jul. 3, 2014 issued by the European Patent Office in counterpart European Patent Application No. 14160037.9.
International Search Report dated Jul. 4, 2014 issued by the International Searching Authority in counterpart International Application No. PCT/KR2014/002230.
Written Opinion dated Jul. 4, 2014 issued by the International Searching Authority in counterpart International Application No. PCT/KR2014/002230.
International Search Report dated Jul. 10, 2014 issued by the International Searching Authority in counterpart International Application No. PCT/KR2014/002229.
Written Opinion dated Jul. 10, 2014 issued by the International Searching Authority in counterpart International Application No. PCT/KR2014/002229.
ITU-R BS.2159-4, "Multichannel sound technology in home and broadcasting applications", May 2012, Total 54 pages, BS Series, Broadcasting service (sound).
Communication dated Dec. 9, 2014, issued by the European Patent Office in counterpart European Application No. 14160037.9.
Communication dated Dec. 9, 2014, issued by the European Patent Office in counterpart European Application No. 14160082.5.
Office Action dated Feb. 22, 2016 issued by the United States Patent and Trademark Office in U.S. Appl. No. 14/212,710.
Office Action dated Jul. 22, 2016 issued by the United States Patent and Trademark Office in U.S. Appl. No. 14/212,710.
Communication dated Jan. 30, 2018, issued by the Japanese Patent Office in counterpart Japanese Application No. 2015-562939.
Communication dated Feb. 27, 2018, issued by the Japanese Patent Office in counterpart Japanese Application No. 2015-562938.
Communication dated Oct. 24, 2017 by the Taiwan Intellectual Property Office in counterpart Taiwanese Patent Application No. 103109532.
Communication dated Dec. 15, 2017 by the State Intellectual Property Office of P.R. China in counterpart Chinese Patent Application No. 201410105496.9.
Communication dated Dec. 28, 2017 by the State Intellectual Property Office of P.R. China in counterpart Chinese Patent Application No. 201410098153.4.
Sarginson, P. A., "MPEG-2: A Tutorial Introduction to the Systems Layer", Jan. 24, 1995, IEEE Colloquium on MPEG What It Is and What It Isn't, 13 pages total.

(56) References Cited

OTHER PUBLICATIONS

Communication dated May 25, 2018, issued by the European Patent Office in counterpart European Application No. 14160082.5.
Communication dated May 25, 2018, issued by the European Patent Office in counterpart European Application No. 14160037.9.
Communication dated Aug. 21, 2018 issued by the Japanese Patent Office in counterpart Japanese Application No. 2015-562938.
Communication dated Aug. 21, 2018 issued by the Japanese Patent Office in counterpart Japanese Application No. 2015-562939.
Communication dated Oct. 25, 2018, issued by the State Intellectual Property Office of P.R. China in counterpart Chinese Application No. 201410098153.4.
Communication dated Dec. 27, 2018, issued by the Taiwanese Patent Office in counterpart Taiwan Application No. 103109537.
"A DTV Profile for Uncompressed High Speed Digital Interfaces CEA-861-E", Mar. 2008, CEA Standard, https://glenwing.github.io/docs/CEA-861-E.pdf, section 3, section 6 and Section 7, 160 pages total.

* cited by examiner

FIG. 4

| seg_nu[1:0]=00 | seg_nu[1:0]=01 | seg_nu[1:0]=10 | seg_nu[1:0]=11 |
|---|---|---|---|
| Stream 0 | Stream 4 | Stream 8 | Stream 12 |
| Stream 1 | Stream 5 | Stream 9 | Stream 13 |
| Stream 2 | Stream 6 | Stream 10 | Stream 14 |
| Stream 3 | Stream 7 | Stream 11 | Stream 15 |

FIG. 5A

| Split_Screen_Config [6:0] | Description |
|---|---|
| 0b000 0000 | Unspecified or single-view mode |
| 0b000 0001 | Split mode 1 (split by 2) <br> Window 1 \| Window 2 |
| 0b000 0010 | Split mode 2 (split by 2) <br> Window 1 / Window 2 |
| 0b000 0011 | Split mode 3 (split by 2) <br> Window 1 with Window 2 inset |
| 0b000 0100 | Split mode 4 (split by 3) <br> Window 1 \| Window 2 \| Window 3 |

FIG. 5B

| Split_Screen_Config [6:0] | Description |
|---|---|
| 0b000 0101 | Split mode 5 (split by 3)<br><br>┌─────────────┐<br>│ Window 1    │<br>├─────────────┤<br>│ Window 2    │<br>├─────────────┤<br>│ Window 3    │<br>└─────────────┘ |
| 0b000 0110 | Split mode 6 (split by 3)<br><br>┌──────┬──────┐<br>│      │Window 2│<br>│Window│──────│<br>│  1   │Window 3│<br>└──────┴──────┘ |
| 0b000 0111 | Split mode 7 (split by 3)<br><br>┌──────┬──────┐<br>│Window 1│Window 2│<br>│──────│      │<br>│Window 3│      │<br>└──────┴──────┘ |
| 0b000 1000 | Split mode 8 (split by 3)<br><br>┌─────────────┐<br>│  Window 1   │<br>├──────┬──────┤<br>│Window 2│Window 3│<br>└──────┴──────┘ |

FIG. 5C

| Split_Screen_Config [6:0] | Description |
|---|---|
| 0b000 1001 | Split mode 9 (split by 3) <br><br> Window 1 \| Window 2 <br> Window 3 |
| 0b000 1010 | Split mode 10 (split by 4) <br><br> Window 1 \| Window 2 <br> Window 3 \| Window 4 |
| 0b000 1011 | Split mode 11 (split by 4) <br><br> Window 1 \| Window 2 <br>            \| Window 3 <br>            \| Window 4 |
| 0b000 1100 | ...(TBD) |
| 0bxxx xxxx ~ 0b111 1111 | Reserved |

DATA TRANSMITTING APPARATUS, DATA RECEIVING APPARATUS, DATA TRANSCEIVING SYSTEM, METHOD FOR TRANSMITTING DATA, AND METHOD FOR RECEIVING DATA

CROSS-REFERENCE TO RELATED APPLICATIONS

This application claims priority from U.S. Provisional Application No. 61/789,803 filed in the United States Patent and Trademark Office on Mar. 15, 2013, U.S. Provisional Application No. 61/802,807 filed in the United States Patent and Trademark Office on Mar. 18, 2013, and Korean Patent Application No. 10-2014-0025653 filed in the Korean Intellectual Property Office on Mar. 4, 2014, the disclosures of which are incorporated herein by reference in their entirety.

BACKGROUND

1. Field

Apparatuses, systems and methods consistent with the exemplary embodiments relate to a method and an apparatus for transceiving data, and more particularly, to a data transmitting apparatus which transmits and receives (transceives) a plurality of audio data with respect to the same content, a data receiving apparatus, a data transceiving system, a method for transmitting data, and a method for receiving data.

2. Description of the Related Art

Recently, with the establishment of a multimedia environment, a high-speed cable interface standard for transmitting various data has been suggested. For example, High Definition Multimedia Interface (HDMI) and Mobile High-Definition Link (MHL) provide standards for transmitting image data, audio signal and control signal in various formats.

However, related art audio signal transmission standards do not include an interface standard for transmitting audio data for a visually impaired person or for transmitting multi-language audio data.

Accordingly, here is a need for an interface standard for transceiving a plurality of audio data related to the same content between a source apparatus and a sink apparatus.

SUMMARY

One or more exemplary embodiments provide an interface standard for transceiving a plurality of audio data related to the same content between a source apparatus and a sink apparatus.

According to an aspect of an exemplary embodiment, there is provided a data transmitting apparatus including a packet generator configured to generate a packet including a first sub packet and a second sub packet and a transmitter configured to transmit the generated packet to a data receiving apparatus. The first sub packet and the second sub packet include different audio data related to a first content.

The first sub packet may include audio data for a non-disabled person, and the second sub packet may include audio data for a visually impaired person.

The first sub packet and the second sub packet may include audio data in different languages.

The first sub packet may include audio data corresponding to an audio description related to the second sub packet.

The packet may further include a third sub packet including audio data regarding a second content which is different from the first content.

Audio data included in the first sub pack may be audio data exclusively provided for the first content, audio data included in the third sub packet may be audio data exclusively provided for the second content, and audio data included in the second sub packet may be audio data which is commonly used for the first content and the second content.

The packet may further include a fourth sub packet including audio data related to the second content, and the third sub packet and the fourth sub packet may include different audio data.

According to an aspect of another exemplary embodiment, there is provided a data receiving apparatus including a receiver configured to receive a packet including a first sub packet and a second sub packet from a data transmitting apparatus and a parser configured to parse the received first sub packet and second sub packet. The first sub packet and the second sub packet include different audio data related to a first content.

The first sub packet may include audio data for a non-disabled person, and the second sub packet may include audio data for a visually impaired person.

The first sub packet and the second sub packet may include audio data in different languages.

The first sub packet may include audio data corresponding to an audio description related to the second sub packet.

The packet may further include a third sub packet including audio data related to a second content which is different from the first content.

Audio data included in the first sub pack may be audio data exclusively provided for the first content, audio data included in the third sub packet may be audio data exclusively provided for the second content, and audio data included in the second sub packet may be audio data which is commonly used for the first content and the second content.

The packet may further include a fourth sub packet including audio data related to the second content, and the third sub packet and the fourth sub packet may include different audio data.

According to an aspect of another exemplary embodiment, there is provided a data transceiving system including a data transmitting apparatus configured to generate a packet including a first sub packet and a second sub packet and transmit the generated packet to a data receiving apparatus and a data receiving apparatus configured to receive the packet from the data transmitting apparatus, and the first sub packet and the second sub packet may include different audio data related to a first content.

According to an aspect of another exemplary embodiment, there is provided a data transmitting apparatus including a packet generator configured to generate an audio metadata packet and a transmitter configured to transmit the generated audio metadata packet to a data receiving apparatus, and a header of the generated audio metadata packet may include a 3D audio field indicating whether a 3D audio sample packet is transmitted.

The header of the generated audio metadata packet may further include a number of audio stream fields containing information about a number of transmitted audio streams.

The header of the generated audio metadata packet may further include a number of view fields containing information about a number of transmitted different contents.

A payload of the generated audio metadata packet may include an audio metadata descriptor field containing metadata about a sub packet of a multi-stream audio sample packet or a multi-stream one bit audio sample packet.

The audio metadata descriptor field may include at least one of an emergency channel field indicating whether there is an emergency broadcasting, a multi-view field indicating whether audio data corresponding to a left-eye image or a right-eye image is included in a multi-view, a language code valid field indicating whether a language of audio data is identified, a supplemental audio valid field indicating whether there is supplemental audio data, a pre-mixed supplemental audio field indicating whether a main audio data and the supplemental audio data are pre-mixed, a supplemental audio type field indicating a type of the supplemental audio data, and a language code field indicating a language code of the audio data.

According to an aspect of another exemplary embodiment, there is provided a data receiving apparatus including a receiver configured to receive an audio metadata packet from a data transmitting apparatus and a parser configured to parse the received audio metadata packet. A header of the received audio metadata packet may include a 3D audio field indicating whether a 3D audio sample packet is transmitted.

The header of the generated audio metadata packet may further include a number of audio stream fields containing information about a number of transmitted audio streams.

The header of the generated audio metadata packet may further include a number of view fields containing information about a number of transmitted different contents.

A payload of the generated audio metadata packet may include an audio metadata descriptor field containing metadata about a sub packet of a multi-stream audio sample packet or a multi-stream one bit audio sample packet.

The audio metadata descriptor field may include at least one of an emergency channel field indicating whether there is an emergency broadcasting, a multi-view field indicating whether to include audio data corresponding to a left-eye image or a right-eye image in a multi-view, a language code valid field indicating whether a language of audio data is identified, a supplemental audio valid field indicating whether there is supplemental audio data, a pre-mixed supplemental audio field indicating whether a main audio data and the supplemental audio data are pre-mixed, a supplemental audio type field indicating a type of the supplemental audio data, and a language code field indicating a language code of the audio data.

According to an aspect of another exemplary embodiment, there is provided a data transceiving system including a data transmitting apparatus configured to generate an audio metadata packet and transmit the generated audio metadata packet to a data receiving apparatus and a data receiving apparatus configured to receive the audio metadata packet from the data transmitting apparatus A header of the audio metadata packet may include a 3D audio field indicating whether a 3D audio sample packet is transmitted.

According to an aspect of another exemplary embodiment, there is provided a data transceiving system including a generator configured to generate display identification information containing information about properties which are supported by a sink apparatus and which are related to audio data and a transmitter configured to transmit the display identification information to a data receiving apparatus, and the display identification information includes a main/supplemental audio properties field containing information about properties of main audio and supplemental audio which are supported by the sink apparatus.

The main/supplemental audio properties field may include at least one of an audio mix field indicating whether the sink apparatus supports a composition of main audio and supplemental audio, a supplemental audio support field indicating whether the sink apparatus supports supplemental audio, a language support field indicating whether the sink apparatus supports audio data in a plurality of languages, a multi-view audio support field indicating whether the sink apparatus supports multi-stream audio data for a multi-view content, a maximum stream count field containing a number of maximum audio streams which is handled by the sink apparatus, and an audio descriptor number field containing a number of 3D audio descriptors.

The display identification information may further include an emergency channel field indicating whether the sink apparatus supports receiving and processing of an emergency broadcasting.

According to an aspect of another exemplary embodiment, there is provided a data receiving apparatus including a receiver configured to receive display identification information including information about properties which are supported by a sink apparatus and which are related to audio data received from a data transmitting apparatus and an analyzer configured to analyze the received display identification information. The display identification information may include a main/supplemental audio properties field containing information about properties of main audio and supplemental audio supported by the sink apparatus.

The main/supplemental audio properties field may include at least one of an audio mix field indicating whether the sink apparatus supports composition of main audio and supplemental audio, a supplemental audio support field indicating whether the sink apparatus supports supplemental audio, a language support field indicating whether the sink apparatus supports audio data in a plurality of languages, a multi-view audio support field indicating whether the sink apparatus supports multi-stream audio data for a multi-view content, a maximum stream count field indicating a number of maximum audio streams which is handled by the sink apparatus, and an audio descriptor number field containing a number of 3D audio descriptors.

The display identification information may further include an emergency channel field indicating whether the sink apparatus supports receiving and processing of an emergency broadcasting.

According to an aspect of another exemplary embodiment, there is provided a data transceiving system including a data transmitting apparatus configured to generate display identification information containing information about properties supported by a sink apparatus and which are related to audio data and to transmit the generated display identification information to a data receiving apparatus. The data receiving apparatus may be configured to receive the display identification information from the data transmitting apparatus, and the display identification information may include a main/supplemental audio properties field containing information about properties of main audio and supplemental audio supported by the sink apparatus.

A data transmitting method according to a further aspect of an exemplary embodiment may include generating a packet including a first sub packet and a second sub packet and transmitting the generated packet to a data receiving apparatus. The first sub packet and the second sub packet may include different audio data related to a first content.

A data receiving apparatus according to another aspect of an exemplary embodiment may include receiving a packet including a first sub packet and a second sub packet from a data transmitting apparatus and parsing the received first sub packet and second sub packet. The first sub packet and the second sub packet may include audio data associated with independent audio channels and related to a first content.

A data transmitting method according to another aspect of an exemplary embodiment may include generating an audio metadata packet and transmitting the generated audio metadata packet to a data receiving apparatus. A header of the generated audio metadata packet may include a 3D audio field indicating whether a 3D audio sample packet is transmitted.

A data receiving method according to a further aspect of an exemplary embodiment may include receiving an audio metadata packet from a data transmitting apparatus and parsing the received audio metadata packet. A header of the received audio metadata packet may include a 3D audio field indicating whether a 3D audio sample packet is transmitted.

According to an aspect of another exemplary embodiment, there is provided a data transmitting method including generating display identification information including information about properties supported by a sink apparatus and which are related to audio data and transmitting the display identification information to a data receiving apparatus. The display identification information may include a main/supplemental audio properties field containing information about properties of main audio and supplemental audio supported by the sink apparatus.

A data receiving method according to another aspect of an exemplary embodiment may include receiving display identification information including information regarding properties supported by a sink apparatus related to audio data from a data transmitting apparatus and analyzing the received display identification information. The display identification information may include a main/supplemental audio properties field containing information about properties of main audio and supplemental audio supported by the sink apparatus.

According to an aspect of another exemplary embodiment, a data transmitting apparatus includes a packet generator configured to generate a packet including a first sub packet and a second sub packet; and a transmitter configured to transmit the generated packet. The first sub packet and the second sub packet may include audio data associated with independent audio channels related to a first content. T The first sub packet may include a first independent audio channel to transmit audio data for a non-disabled person, and a second sub packet may include a second independent audio channel to transmit audio data for a visually impaired person.

The first sub packet may also include a first independent audio channel to transmit audio data in a first language, and the second sub packet may include a second independent audio channel to transmit audio data in a second language.

The first sub packet may include audio data corresponding to an audio description related to the second sub packet. In addition, the packet may further include a third sub packet including audio data related to a second content which is different from the first content.

Audio data may be included in the first sub packet which includes audio data exclusively provided for the first content, and audio data included in the third sub packet may include audio data exclusively provided for the second content. The audio data included in the second sub packet may include audio data which is commonly used for the first content and for the second content. The packet may further include a fourth sub packet including audio data related to the second content, and the third sub packet and the fourth sub packet may include audio data associated with independent audio channels.

According to various aspects of the exemplary embodiments, an interface standard for transceiving a plurality of audio data related to the same content between a source apparatus and a sink apparatus is provided.

BRIEF DESCRIPTION OF THE DRAWINGS

The above and/or other aspects of the present inventive concept will be more apparent from the following description of exemplary embodiments taken in conjunction with the accompanying drawings, in which:

FIG. 4 is a block diagram illustrating the payload of four transmitted multi-audio sample packets;

FIGS. 5A, 5B and 5C illustrate split-screen types associated with an audio stream according to an exemplary embodiment;

DETAILED DESCRIPTION

Figure 1A:
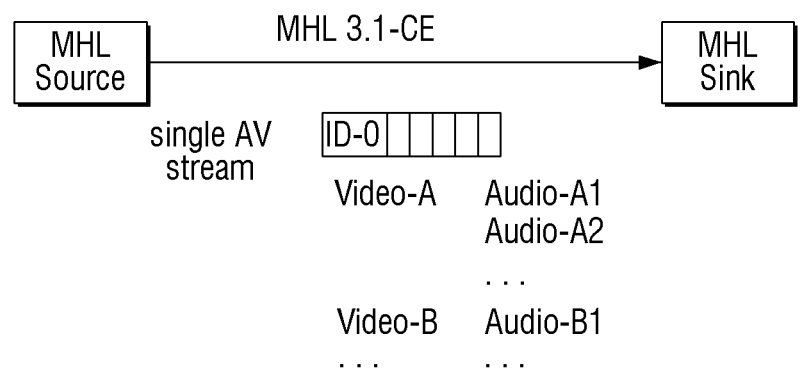
FIG. 1A illustrates a single audio stream.

In the following description, the same drawing reference numerals are used for the same elements even in different drawings. The matters defined in the description, such as detailed construction and elements, are provided to assist in a comprehensive understanding of exemplary embodiments. Method steps and system components are illustrated by using conventional symbols in the drawings, showing only specific details which are relevant for an understanding of the exemplary embodiments. Well-known functions or constructions are not described in detail since they would obscure exemplary embodiments with unnecessary detail. Relational terms, such as first and second, and the like, are used to distinguish one element from another element. These terms do not necessarily imply any actual relationship or order between such elements.

The exemplary embodiments may be applied to, but are not limited to, various cable interface transmission standards such as HDMI, MHL and similar cable interface standards.

The following documents are referred to in describing the exemplary embodiments and are incorporated in their entirety.

ITU-R BS.2159-4 (May 2012), Multichannel sound technology in home and broadcasting applications.

SMPTE, SMPTE 2036-2:2008, "UHDTV—Audio characteristics and audio channel mapping for program production", 2008.

IEC, IEC 62574 ed 1.0, "Audio, video and multimedia systems—General channel assignment of multichannel audio", Apr. 7, 2011.

In Table 1, terms are defined which are used in describing the exemplary embodiments.

TABLE 1

| Term | Definition |
| --- | --- |
| Terms and Definitions | |
| MHL Source | A device with an MHL output port. An MHL Source uses a receptacle and not a plug at its MHL output port. |
| MHL Sink | A device which includes one or more MHL input ports. An MHL Sink uses a receptacle and not a plug at each MHL input port. |
| 3D Audio | An audio system the speakers of which are placed anywhere in 3D space in contrast to the 5.1 or 7.1 Audio Standard which do not include an element of height and typically place speakers in a horizontal 2D plane. 3D Audio uses the channel layouts defined in ITU-R BS.2159-4 (Type B 10.2ch), SMPTE2036-2 (22.2ch), or IEC62574 (30.2ch). 3D Audio also includes a down-mixed audio streams defined in these standards that include 9 or more audio channels. 3D Audio refers to a finite number of discrete channels and not to object-based audio. |
| Multi-Audio | A collection of audio streams associated with one or more video streams. Multi-Audio is transported as a single AV Stream. Multi-Audio does not refer to the transmission of multiple audio streams via Multi-AV Streaming. |
| Stream | A time-ordered set of digital data originating from one MHL Source and terminating at one MHL Sink. A Stream is characterized by bandwidth requirements, synchronization points, or time stamps, within the stream data. |
| AV Stream | A collection of packet data that includes multiple video streams, multiple audio streams, and auxiliary information about these streams. Auxiliary information includes characteristics of the video streams and the audio streams, and information on how to synchronize between the video and the audio streams. A packet ID is assigned to an AV Stream. |
| Multi-AV Stream | A collection of multiple AV Streams in which a unique packet ID is assigned to each AV Stream. |
| Single-View | A view mode in which only a single audio stream is displayed on a display of an MHL Sink. |
| Multi-View | A viewing option (of an MHL Sink) in which two or more independent video streams are simultaneously displayed on a display of an MHL Sink, and in which a viewer may only see one video stream at any given time. Multi-View video may be transmitted in 3D Video Formats. Each independent video content is carried in Left and Right stereoscopic pictures, respectively. |
| Window | A (spatial) subset of a video image that is displayed on a display of a MHL Sink. A video image is composed of one or more Windows. The windows do not overlap with each other. |
| Split-Screen | A viewing option (of an MHL Sink) in which two or more Windows are identified and tagged by the MHL Source (e.g., PIP TV viewing, TV quick-preview, multi-screen gaming). |

Figure 1B:
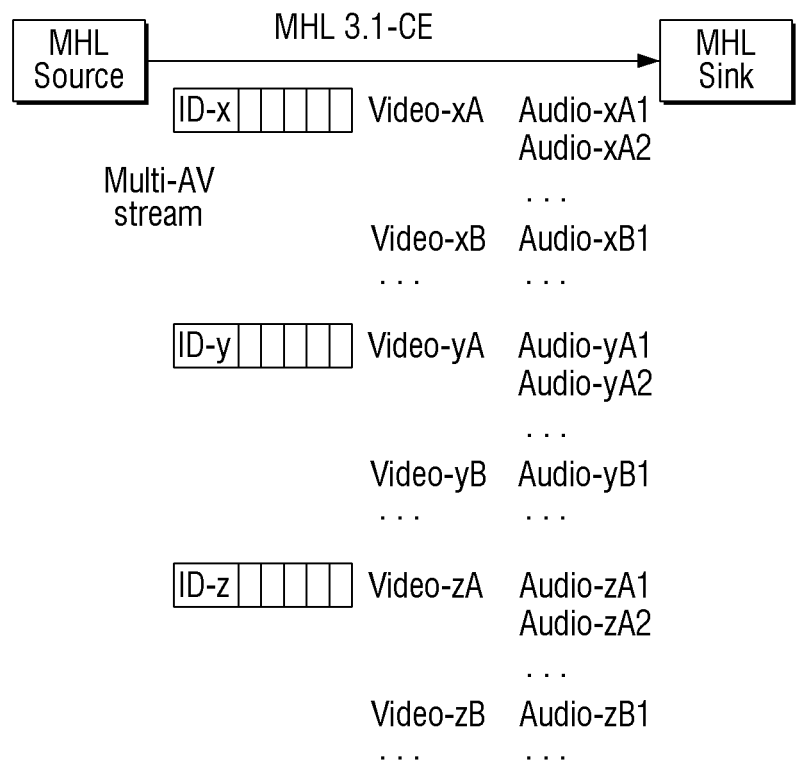
FIG. 1B illustrates a multi-audio stream.

FIGS. 1A and 1B illustrate a single audio stream and a multi-audio stream.

FIG. 1A shows a single audio stream to transmit a plurality of audio data related to at least one video data. The plurality of audio data is transmitted by a single stream. In the single stream shown in FIG. 1A, all stream data is packetized to share the same packet stream ID.

FIG. 1B shows a multi-audio stream which transmits a plurality of single AV streams. The multi-audio stream transmits the plurality of single AV streams in groups. A unique packet stream ID is assigned to each single AV stream. The video data of the plurality of single AV streams is interdependent.

Each audio stream of a multi-audio stream transmits audio data of two audio channels. Each audio stream in a single-view mode may be connected to a default video stream, and an audio stream in a dual view mode may be connected to a left image or a right image (or both). In addition, one or more supplemental audio options may be transmitted. Supplemental audio options may include split-screen tagging, language indication, and indication of audio for visually/hearing impaired persons.

A split-screen source apparatus provides a viewing option in which different audio data is tagged and identified by the split-screen source apparatus and assigned to one or more windows displayed on a display screen of a sink apparatus. The split-screen source apparatus is used in PIP viewing, quick-preview viewing, split-screen multi-player gaming, etc. A window is a distinctive display image displayed in an area of the display screen of the sink apparatus.

The split-screen (or multi-window) may be a selective element which is used in conjunction with a plurality of audio data. A split-screen mode is a configuration in which a screen is split and provided with sink apparatus tags. An audio stream and is mapped to a specific window displayed on the display screen of the sink apparatus.

Figure 2A:
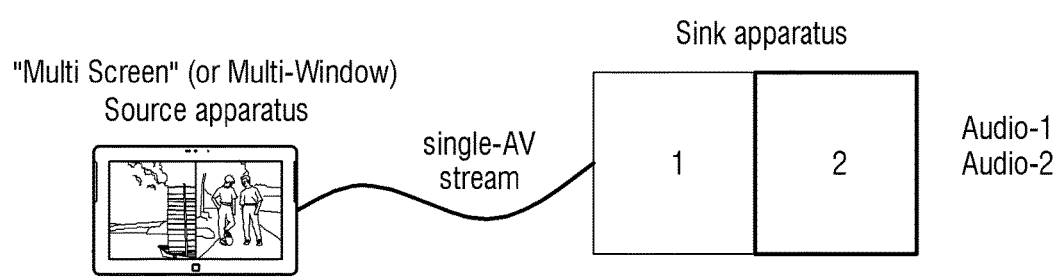
FIG. 2A is a block diagram illustrating a multi-window or multi-screen source apparatus which transmits a plurality of audio data to a sink apparatus.
Figure 2B:
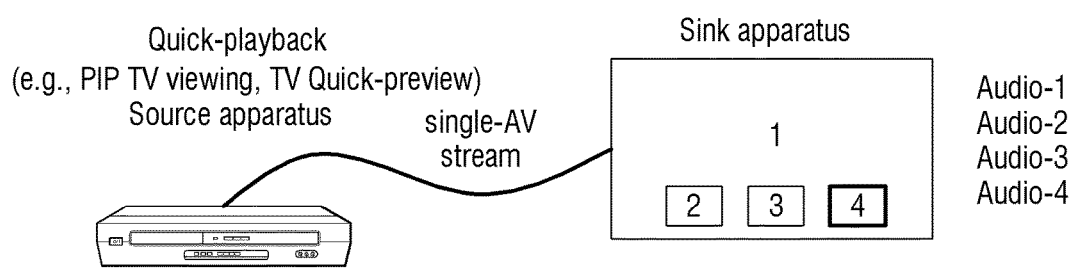
FIG. 2B is a block diagram illustrating a quick playback source apparatus which transmits a plurality of audio data related to a quick-preview or a picture-in-picture (PIP) view to a sink apparatus.
Figure 2C:
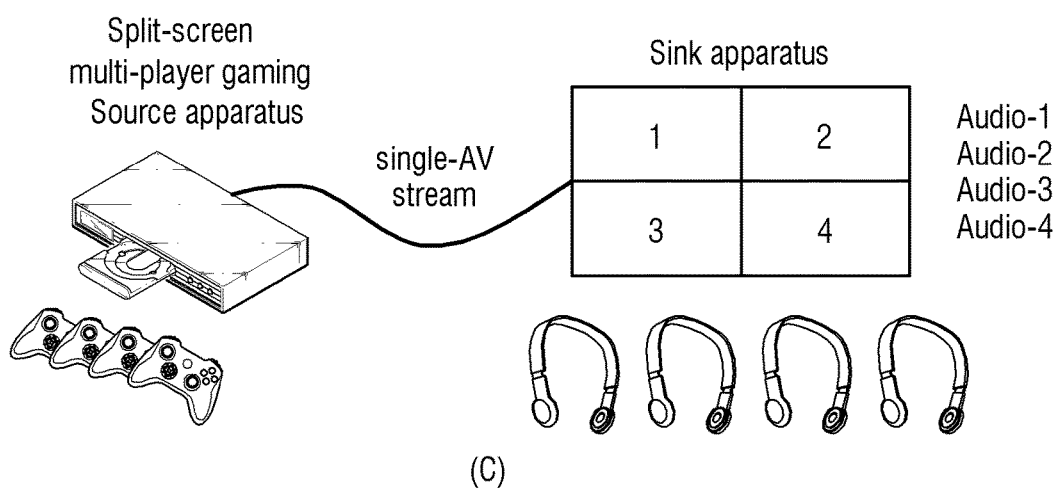
FIG. 2C is a block diagram illustrating a split-screen multi-player game source apparatus which transmits a plurality of audio data to a sink apparatus.

FIGS. 2A, 2B and 2C are block diagrams illustrating source apparatuses which transmit a plurality of audio data to a sink apparatus.

FIG. 2A is a block diagram illustrating a multi-window or multi-screen source apparatus which transmits a plurality of audio data to a sink apparatus according to an exemplary embodiment. FIG. 2B is a block diagram illustrating a quick playback source apparatus which transmits a plurality of audio data to a sink apparatus related to a quick-preview or a PIP view according to an exemplary embodiment. FIG. 2C is a block diagram illustrating a split screen multi-player game source apparatus which transmits a plurality of audio data to a sink apparatus according to an exemplary embodiment. A user of the sink apparatus may select and listen to desired audio.

Figure 3:
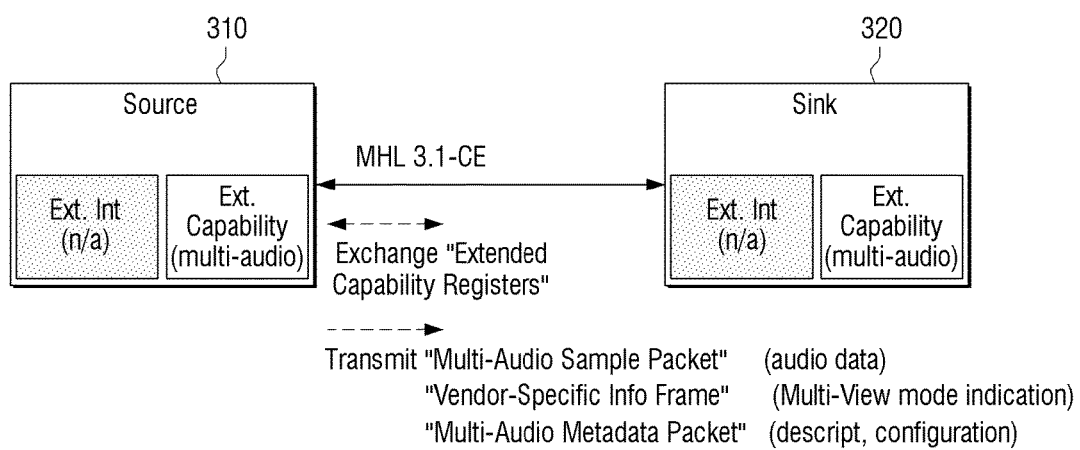
FIG. 3 is a block diagram illustrating a data transmission between a sink apparatus and a source apparatus to display split-screen support information.

FIG. 3 is a block diagram illustrating a data transmission between a sink apparatus and a source apparatus to display split-screen support information.

A source apparatus 310 transmits a vendor-specific info frame, a multi-audio sample packet, and a multi-audio metadata packet to the sink apparatus.

The multi-audio sample packet includes a plurality of audio streams. The multi-audio metadata packet includes settings of each audio stream which is related to a video stream. The multi-audio metadata packet may also include supplemental audio information. The vendor-specific info frame may include a multi-view mode indication, i.e., a type of the transmitted content.

A sink apparatus 320 transmits an extended device capability register to a source apparatus to provide information about a multi-audio mode which is supported by the sink apparatus.

Supplementary Multi-Audio supports transmission of auxiliary audio tracks, e.g. multi-language tracks, audio description for a visually impaired person, or audio for a hearing impaired person). Up to 16 stereo audio streams can be transmitted simultaneously.

TMDS Signaling and Encoding

Data Platform Packet

TABLE 2

| Packet Types | | |
|---|---|---|
| Packet Type Value | Packet Type | Section |
| 0x00 | Null | 4.x |
| 0x01 | Audio Clock Regeneration (N/CTS) Packet | 4.x |
| 0x02 | Audio Sample Packet | 4.x |
| 0x03 | Content Mute Packet | 4.x |
| 0x04 | 3D Audio Sample Packet | 4.x |
| 0x05 | Multi-Audio Sample Packet | 4.x |
| 0x06 | 3D Audio Metadata Packet | 4.x |
| 0x07 | Multi-Audio Metadata Packet | 4.x |
| 0x80 + InfoFrame Type | EIA/CEA-861E Info Frame | 4.x |

3D Audio Sample Packet 3D audio is defined as audio in which a speaker may be disposed at a predetermined position for each 3D audio standard (e.g. 10.2ch, 22.2ch, 30.2ch, etc.) in a 3D space. 3D Audio Sample Packets consist of one Audio Sample which contains 9 to 32 audio channels.

A 3D audio stream includes up to 32 audio channels (or more), and is transmitted through consecutive packets in a data sum section. Each packet includes up to 8 audio channels. The configuration of the sub packets is determined by the sequence number and the sample present bits in the header.

A sequence number field (sequence_number) indicates the order of the current packet. Since multiple 3D Audio Sample Packets include single 3D Audio Sample Packets, this field is necessary to correctly identify the packet order.

Other header fields and Sub-packet structures are identical to the structure of the Audio Sample Packet shown in the MHL 2.0 specification.

TABLE 3

| 3D Audio Sample Packet | | | | | | | | |
|---|---|---|---|---|---|---|---|---|
| Byte\Bit # | 7 | 6 | 5 | 4 | 3 | 2 | 1 | 0 |
| HB0 | 0 | 0 | 0 | 0 | 0 | 1 | 0 | 0 |
| HB1 | 0 | 0 | sequence_number | | sample present.sp3 | sample present.sp2 | sample present.sp1 | sample present.sp0 |
| HB2 | B.3 | B.2 | B.1 | B.0 | sample flat.sp3 | sample flat.sp2 | sample flat.sp1 | sample flat.sp0 |
| PB0 | L.11 | ... | ... | ... | ... | ... | ... | L.4 |
| PB1 | L.19 | ... | ... | ... | ... | ... | ... | L.12 |
| PB2 | L.27 | ... | ... | ... | ... | ... | ... | L.20 |
| PB3 | R.11 | ... | ... | | | | | R.4 |
| PB4 | R.19 | ... | ... | ... | ... | ... | ... | R.12 |
| PB5 | R.27 | ... | ... | ... | ... | ... | ... | R.20 |
| PB6 | PR | CR | UR | VR | PL | CL | UL | VL |
| PB7 | L.11 | ... | ... | ... | ... | ... | ... | L.4 |
| PB8 | L.19 | ... | ... | ... | ... | ... | ... | L.12 |
| PB9 | L.27 | ... | ... | ... | ... | ... | ... | L.20 |
| PB10 | R.11 | ... | ... | | | | | R.4 |

TABLE 3-continued

3D Audio Sample Packet

| Byte\Bit # | 7 | 6 | 5 | 4 | 3 | 2 | 1 | 0 |
|---|---|---|---|---|---|---|---|---|
| PB11 | R.19 | ... | ... | ... | ... | ... | ... | R.12 |
| PB12 | R.27 | ... | ... | ... | ... | ... | ... | R.20 |
| PB13 | PR | CR | UR | VR | PL | CL | UL | VL |
| PB14 | L.11 | ... | ... | ... | ... | ... | ... | L.4 |
| PB15 | L.19 | ... | ... | ... | ... | ... | ... | L.12 |
| PB16 | L.27 | ... | ... | ... | ... | ... | ... | L.20 |
| PB17 | R.11 | ... | ... | | | | | R.4 |
| PB18 | R.19 | ... | ... | ... | ... | ... | ... | R.12 |
| PB19 | R.27 | ... | ... | ... | ... | ... | ... | R.20 |
| PB20 | PR | CR | UR | VR | PL | CL | UL | VL |
| PB21 | L.11 | ... | ... | ... | ... | ... | ... | L.4 |
| PB22 | L.19 | ... | ... | ... | ... | ... | ... | L.12 |
| PB23 | L.27 | ... | ... | ... | ... | ... | ... | L.20 |
| PB24 | R.11 | ... | ... | | | | | R.4 |
| PB25 | R.19 | ... | ... | ... | ... | ... | ... | R.12 |
| PB26 | R.27 | ... | ... | ... | ... | ... | ... | R.20 |
| PB27 | PR | CR | UR | VR | PL | CL | UL | VL |

Multi-Audio Sample Packet

A Multi-Audio Sample Packet consists of four Audio Samples and each Audio Sample is associated with an independent audio stream. When an MHL Source device transmits more than four independent audio streams simultaneously, these consecutive audio streams are transmitted in a series of continuous Multi-Audio Sample Packets. The sequence number defined in the packet header identifies each of the Multi-Audio Sample Packets and indicates the order of the current packet within the array of packets. The configuration of the sub-packets is determined by the sequence number and the sample present bits in the header as described in detail with regard to Multi-Audio Data Packetization.

For each sub-packet (or audio stream), a descriptor field is provided in the Multi-Audio Metadata Packet which describes the viewing mode (i.e., single-view or multi-view). In addition, optional information (e.g., Split-Screen tagging, language code, audio for a visually impaired person, etc.) is provided.

The sequence number field (sequence_number) stores the sequence number of the current Multi-Audio Sample Packet when more than four audio streams are transmitted from the Source to the MHL Sink. If this field is set to 0, the packet may include the first four audio streams in the corresponding sub-packets. If this field is set to 1, the packet may include the second set of four audio streams in the corresponding sub-packets. In a similar way, the packet may include third or fourth sets of four audio streams when this field is set to 2 or 3. The audio stream carried in Subpacket 0 with sequence_number set to 0 may be designated as the default audio stream.

The stream present field (stream_present.spX) indicates whether subpacket X contains an audio sample(s) of stream X.

The stream flat field (stream_flat.spX) indicates whether subpacket X represents a "flatline" sample of stream X which is only valid if "stream_present.spX" is also set.

Other header fields and Sub-packet structures are identical with the Audio Sample Packet described in the MHL 2.0 specification.

TABLE 4

Multi-Audio Sample Packet

| Byte\Bit # | 7 | 6 | 5 | 4 | 3 | 2 | 1 | 0 |
|---|---|---|---|---|---|---|---|---|
| HB0 | 0 | 0 | 0 | 0 | 0 | 1 | 0 | 1 |
| HB1 | 0 | 0 | sequence_number | | stream present.sp3 | stream present.sp2 | stream present.sp1 | stream present.sp0 |
| HB2 | B.3 | B.2 | B.1 | B.0 | stream flat.sp3 | stream flat.sp2 | stream flat.sp1 | stream flat.sp0 |
| PB0~PB6 | Audio sample data for audio stream N + 0 | | | | | | | |
| PB7~PB13 | Audio sample data for audio stream N + 1 | | | | | | | |
| PB14~PB20 | Audio sample data for audio stream N + 2 | | | | | | | |
| PB21~PB27 | Audio sample data for audio stream N + 3 | | | | | | | |

FIG. 4 is a block diagram illustrating the payload of four transmitted multi-audio sample packets.

As shown in FIG. 4, when 4 multi-audio sample packets are transmitted, 16 audio steams may be delivered. Since the sequence number consists of 2 bits, 16 audio streams may be delivered.

3D Audio Metadata Packet

Ancillary data that describes the active 3D Audio data is transmitted using the 3D Audio Metadata Packet. An MHL Source transmits a 3D Audio Metadata Packet at least once every two video fields when the MHL Source is transmitting 3D Audio Sample Packets.

The following table shows the 3D Audio Metadata Packet.

TABLE 5

| 3D Audio Metadata Packet | | | | | | | | |
|---|---|---|---|---|---|---|---|---|
| Byte\Bit # | 7 | 6 | 5 | 4 | 3 | 2 | 1 | 0 |
| HB0 | 0 | 0 | 0 | 0 | 0 | 1 | 1 | 1 |
| HB1 | 0 | 0 | 0 | 0 | 0 | 0 | 0 | 0 |
| HB2 | 0 | 0 | 0 | 0 | 0 | 0 | 0 | 0 |
| PB0 | 0 | 0 | 0 | \multicolumn{5}{l|}{3D_CC} |
| PB1 | 0 | 0 | 0 | 0 | \multicolumn{4}{l|}{3D_CAST} |
| PB2 | \multicolumn{8}{l|}{3D_CA} |
| PB3~PB27 | \multicolumn{8}{l|}{Reserved} |

TABLE 6

| 3D_CC (3D Audio Channel Count) field | |
|---|---|
| 3D_CC [4:0] | Audio Channel Count |
| 0b00000 | Refer to Stream Header |
| 0b00001 | 9 channels |
| 0b00010 | 10 channels |
| ... | ... |

TABLE 6-continued

| 3D_CC (3D Audio Channel Count) field | |
|---|---|
| 3D_CC [4:0] | Audio Channel Count |
| 0b11000 | 32 channels |
| 0b11001~0b11111 | Reserved |

TABLE 7

| 3D_CAST (3D Audio Channel Allocation Standard Type) field | |
|---|---|
| 3D_CAST [3:0] | Description |
| 0b0000 | Reserved |
| 0b0001 | Up to 10.2 channels Based on ITU-R BS. 2159-4 (Type B, 10.2ch) |
| 0b0010 | Up to 22.2 channels Based on SMPTE 2036-2 |
| 0b0011 | Up to 30.2 channels Based on IEC 62574/Ed.1 |
| 0b0100~0b1111 | Reserved |

TABLE 8

3D_CA (3D Audio Channel/Speaker Allocation) field (3D_CAST = 0x01 (up to 10.2ch))

| 3D_CA | Channel Number | | | | | | | | | | | |
|---|---|---|---|---|---|---|---|---|---|---|---|---|
| (hex) | 12 | 11 | 10 | 9 | 8 | 7 | 6 | 5 | 4 | 3 | 2 | 1 |
| 0x00 | TpFC | LFE2 | TpFR | TpFL | BR | BL | RS | LS | FC | LFE1 | FR | FL |
| 0x01 | | | | | Reserved | | | | | | | |
| ... | | | | | | | | | | | | |
| 0xFF | | | | | | | | | | | | |

TABLE 9

3D_CA (3D Audio Channel/Speaker Allocation) field (3D_CAST = 0x02(up to 22.2ch))

| 3D_CA | Channel Number | | | | | | | | | | | |
|---|---|---|---|---|---|---|---|---|---|---|---|---|
| (hex) | 12 | 11 | 10 | 9 | 8 | 7 | 6 | 5 | 4 | 3 | 2 | 1 |
| 0x00 | TpFC | LFE2 | TpFR | TpFL | BR | BL | SiR | SiL | FC | LFE1 | FR | FL |
| 0x01 | TpFC | LFE2 | TpFR | TpFL | BR | BL | SiR | SiL | FC | LFE1 | FR | FL |
| 0x02 | | | | | Reserved | | | | | | | |
| ... | | | | | | | | | | | | |
| 0xFF | | | | | | | | | | | | |

| 3D_CA | Channel Number | | | | | | | | | | | |
|---|---|---|---|---|---|---|---|---|---|---|---|---|
| (hex) | 24 | 23 | 22 | 21 | 20 | 19 | 18 | 17 | 16 | 15 | 14 | 13 |
| 0x00 | — | — | — | — | — | — | — | — | — | — | — | — |
| 0x01 | BtFC | BtFR | BtFL | TpC | TpSiR | TpSiL | TpBC | TpBR | TpBL | BC | FRC | FLC |
| 0x02 | | | | | Reserved | | | | | | | |
| ... | | | | | | | | | | | | |
| 0xFF | | | | | | | | | | | | |

TABLE 10

3D_CA (3D Audio Channel/Speaker Allocation) field (3D_CAST = 0x03(up to 30.2ch))

| 3D_CA (hex) | Channel Number | | | | | | | | | | | |
|---|---|---|---|---|---|---|---|---|---|---|---|---|
| | 12 | 11 | 10 | 9 | 8 | 7 | 6 | 5 | 4 | 3 | 2 | 1 |
| 0x00 | TpFC | LFE2 | TpFR | TpFL | BR | BL | SiR | SiL | FC | LFE1 | FR | FL |
| 0x01 | TpFC | LFE2 | TpFR | TpFL | BR | BL | SiR | SiL | FC | LFE1 | FR | FL |
| 0x02 | TpFC | LFE2 | TpFR | TpFL | BR | BL | SiR | SiL | FC | LFE1 | FR | FL |
| 0x03 | Reserved | | | | | | | | | | | |
| ... | | | | | | | | | | | | |
| 0xFF | | | | | | | | | | | | |

| 3D_CA (hex) | Channel Number | | | | | | | | | | | |
|---|---|---|---|---|---|---|---|---|---|---|---|---|
| | 24 | 23 | 22 | 21 | 20 | 19 | 18 | 17 | 16 | 15 | 14 | 13 |
| 0x00 | — | — | — | — | — | — | — | — | — | — | — | — |
| 0x01 | BtFC | BtFR | BtFL | TpC | TpSiR | TpSiL | TpBC | TpBR | TpBL | BC | FRC | FLC |
| 0x02 | BtFC | BtFR | BtFL | TpC | TpSiR | TpSiL | TpBC | TpBR | TpBL | BC | FRC | FLC |
| 0x03 | Reserved | | | | | | | | | | | |
| ... | | | | | | | | | | | | |
| 0xFF | | | | | | | | | | | | |

| 3D_CA (hex) | Channel Number | | | | | | | | |
|---|---|---|---|---|---|---|---|---|---|
| | 32 | 31 | 30 | 29 | 28 | 27 | 26 | 25 | |
| 0x00 | — | — | — | — | — | — | — | — | |
| 0x01 | — | — | — | — | — | — | — | — | |
| 0x02 | TpRS | TpLS | RSd | LSd | RS | LS | FRW | FLW | |
| 0x03 | Reserved | | | | | | | | |
| ... | | | | | | | | | |
| 0xFF | | | | | | | | | |

Multi-Audio Metadata Packet

Ancillary data that describes the active Multi-Audio stream is transmitted using the Multi-Audio Metadata Packet. The Multi-Audio packet is used to describe the view type and auxiliary audio options for each audio stream that is transported in the Multi-Audio Sample Packets.

An MHL Source transmits a Multi Stream Audio Metadata Packet at least once every two video fields when the MHL Source is transmitting Multi-Audio Sample Packets.

The following table shows the Multi-Audio Metadata Packet.

TABLE 11

Multi-Audio Metadata Packet

| Byte\Bit # | 7 | 6 | 5 | 4 | 3 | 2 | 1 | 0 |
|---|---|---|---|---|---|---|---|---|
| HB0 | 0 | 0 | 0 | 0 | 1 | 0 | 0 | 0 |
| HB1 | MA_View_Type | | Sequence_Number | | Num_Audio_Streams | | | |
| HB2 | SC_Valid | 000 0000 (or Split_Screen_Config, if SC_Valid = 1) | | | | | | |
| PB0~PB6 | MA_Descriptor_0 | | | | | | | |
| PB7~PB13 | MA_Descriptor_1 | | | | | | | |
| PB14~PB20 | MA_Descriptor_2 | | | | | | | |
| PB21~PB27 | MA_Descriptor_3 | | | | | | | |

The view type field (MA_View_Type) indicates the associated viewing mode of Multi-Audio streams such as Single-View mode or Multi-View mode, as shown in Table 11.

The sequence number field (Sequence_Number) indicates the packet or sequence number of the current Multi-Audio Metadata Packet. This field is used to identify up to four unique Multi-Audio Metadata Packets. The sequence number field uniquely links each Multi-Audio Metadata Packet to a Multi-Audio Sample Packet that has the same Sequence_Number.

The audio stream number field (Num_Audio_Streams) indicates the total number of audio streams transmitted by the Multi-Audio Sample Packets.

When the split screen valid field (SC_Valid) is set to 1, Split-Screen tagging is supported and a split-screen type field (Split_Screen_Config) is defined by the following 7 bits. If the split screen valid field (SC_Valid) is set to 0, Split-Screen tagging is either not supported or unspecified and the following 7 bits are reserved for other use.

The split screen type field (Split_Screen_Config) indicates the split-screen type associated with the audio stream defined by the current descriptor. The selectable split-screen types are listed in Table 13. The split-screen type field is valid only if SC_Valid is set to 1.

The multi-audio descriptor field (MA_Descriptor_X) indicates the characteristics of an audio stream transmitted by Sub-packet X of the corresponding Multi-Audio Sample Packet. Table 14 shows the detailed structure of a Multi-Audio Descriptor.

TABLE 12

Multi-Audio Type field

| MA_View_Type [1:0] | Description |
|---|---|
| 0b00 | Unspecified or single-view mode |
| 0b01 | Multi-View mode |
| 0b10 | Reserved |
| 0b11 | Reserved |

The following table shows the Multi-Audio descriptor definition.

TABLE 13

| | Multi-Audio Descriptor Bit # | | | | | | | |
|---|---|---|---|---|---|---|---|---|
| Byte | 7 | 6 | 5 | 4 | 3 | 2 | 1 | 0 |
| PB N + 0 | | | Split_Screen_Tag | | 0 | 0 | Associated_View_ID | |
| PB N + 1 | LC_present | 0 | Mixed_Audio | SAT_present | | | Suppl_Audio_Type | |
| PB N + 2 | Language_Code (3 Bytes) | | | | | | | |
| PB N + 3 | | | | | | | | |
| PB N + 4 | | | | | | | | |
| PB N + 5 | 0 | 0 | 0 | 0 | 0 | 0 | 0 | 0 |
| PB N + 6 | 0 | 0 | 0 | 0 | 0 | 0 | 0 | 0 |

FIGS. 5A, 5B and 5C illustrate split-screen types associated with an audio stream according to an exemplary embodiment.

The split-screen tag field (Split_Screen_Tag) sets a specific Window (as defined by Split_Screen_Config) associated with the audio stream indicated by the current Multi-Audio Descriptor. Details are shown in Table 15. The split-screen tag field is only valid if SC_Valid is set to 1, otherwise the MHL Sink ignores this field.

The associated view identification field (Associated_View_ID) indicates the specific view associated with the audio stream indicated by the current Multi-Audio Descriptor. The meaning of this field depends on the value of MA_View_Type. Details are shown in Table 14

When the valid language code field (LC_present) is set to 1, the current descriptor includes a valid Language_Code field at the following bytes.

When the mixed-audio field (Mixed_Audio) is set to 1, the corresponding audio stream contains a pre-mixed stream of general audio and supplementary audio as indicated by Suppl_Audio_Type.

When the SAT present field (SAT_present) is set to 1, the current descriptor includes a valid Suppl_Audio_Type field at the following 4 bits.

The supplemental audio feature field (Suppl_Audio_Type) indicates the type of the supplementary audio for the corresponding audio stream. Details of the supplemental audio feature field are shown in Table 16. The supplementary audio feature field is only valid if SAT_present is set to 1, otherwise the MHL Sink will ignore this field.

The language code field (Language_Code) indicates the ISO 639-defined language code of the corresponding audio stream. This field is only valid if the LC_present field is set to 1, otherwise the MHL Sink will ignore this field.

TABLE 14

| | Associated View Identifier field | |
|---|---|---|
| MA_View_Type | Associated_View_ID [2:0] | Description |
| 0b00 | 0b00 | Unspecified or default view |
| 0b01 | 0b00 | Left stereoscopic picture of 3D field |
| | 0b01 | Right stereoscopic picture of 3D field |
| | 0b10~0b11 | Reserved |

TABLE 15

| Split-Screen Tag field | |
|---|---|
| Split_Screen_Tag [3:0] | Description |
| 0b0000 | Window 1 |
| 0b0001 | Window 2 |
| 0b0010 | Window 3 |
| ... | ... |
| 0b1111 | Window 16 |

TABLE 16

| Supplementary Audio Feature field | |
|---|---|
| Suppl_Audio_Type [3:0] | Description |
| 0b0000 | Unspecified or general Audio |
| 0b0001 | Narrated Audio for the visually impaired |
| 0b0010 | Spoken subtitles for the visually impaired |
| 0b0011 | Clean audio for the hearing impaired |
| 0b0100 | Emergency audio channel |
| 0b0101~0b1111 | Reserved |

Active Multi-Audio Mobile Indicator

The Source device uses an Vendor-Specific Info Frame (VSIF) to indicate to the Sink device a viewing mode. The format of the VSIF is shown in Table 17.

TABLE 17

| | Vendor-Specific Info Frame Packet Bit # | | | | | | | |
|---|---|---|---|---|---|---|---|---|
| Byte | 7 | 6 | 5 | 4 | 3 | 2 | 1 | 0 |
| HB0 | InfoFrame_Type = 0x81 | | | | | | | |
| HB1 | InfoFrame_version = 0x01 | | | | | | | |
| HB2 | 0 | 0 | 0 | InfoFrame_length | | | | |
| PB0 | Checksum | | | | | | | |
| PB1 | 24-bit IEEE-assigned Organizationally Unique Identifier (OUI) 0x7CA61D | | | | | | | |
| PB2 | | | | | | | | |
| PB3 | | | | | | | | |
| PB4 | Reserved | | MHL_3D_FMT_TYPE | | | MHL_VID_FMT | | |
| PB5 | TBD? (for High-End Video Mode) | | | | | | | |
| PB6 | 0 | 0 | 0 | 0 | 0 | 0 | 0 | MHL_MULTI_VIEW |
| PB7 ... PB26 | Reserved | | | | | | | |
| PB27 | Reserved | | | | | | | |

The MHL_MULTI_VIEW field indicates a Multi-View mode. Details of the MHL_MULTI_VIEW field are shown in Table 18.

TABLE 18

MHL_MULTI_VIEW field

| MHL_MULTI_VIEW [2:0] | Description |
|---|---|
| 0b000 | Unspecified or Single-View mode |
| 0b001 | Dual-View mode |
| 0b010 | Triple-View mode |
| 0b011 | Quad-View mode |
| 0b100~0b111 | Reserved |

Video
3D Video Descriptor for 3D Support

TABLE 19

3D Video Descriptor Data Format

| | Bit | | | | | | | |
|---|---|---|---|---|---|---|---|---|
| | 7 | 6 | 5 | 4 | 3 | 2 | 1 | 0 |
| VDI_L | Reserved | | | | MV_SUPP | LR_SUPP | TB_SUPP | FS_SUPP |
| VDI_H | Reserved | | | | | | | |

Each supported 3D video mode is defined by one 3D Video Descriptor.

When MV_SUPP is set to 1, the device supports 3D video formats for Multi-View video streaming.

Audio
Channel/Speaker Assignment

When an MHL Sink is capable of receiving 3D Audio data, the 3D Channel Speaker Allocation Descriptor described in Tables 38 to 40 are used to indicate the configuration of the attached speakers. The current speaker assignment for 3D Audio data transmitted from a MHL Source is indicated in the 3D_CA field of the 3D Audio Metadata Packet, as shown in Tables 8 to 10.

3D Audio Data Packetization

Each Sub-packet of a 3D Audio Sample Packet does not contain a frame of an IEC 60958 format or contains one frame of an IEC 60958 format. If a MHL Source needs to down mix the 3D Audio stream and the down-mixed audio streams are also 3D Audio streams, the 3D Audio streams are transmitted using 3D Audio Sample Packets. If a MHL Sink does not support 3D Audio feature, a MHL Source does not transmit 3D Audio Sample Packets in addition to 3D Audio Metadata Packet.

Depending on the number of channels, a number of different Sub-packet layouts may be provided. Tables 20 to 22 show the 3D Audio Packet Layouts when 12, 24, or 32 channels are used, respectively.

TABLE 20

3D Audio Sample Packet Layout for 12 channels

| Packet # | sequence number | Num Channels | Sample | Subpkt 0 | Subpkt 1 | Subpkt 2 | Subpkt 3 |
|---|---|---|---|---|---|---|---|
| 0 | 0 | 12 | 1 | Chnl 1, 2 (Sample 0) | Chnl 3, 4 (Sample 0) | Chnl 5, 6 (Sample 0) | Chnl 7, 8 (Sample 0) |
| 1 | 1 | | | Chnl 9, 10 (Sample 0) | Chnl 11, 12 (Sample 0) | Empty | Empty |

TABLE 21

3D Audio Sample Packet Layout for 24 channels

| Packet # | sequence number | Num Channels | Sample | Subpkt 0 | Subpkt 1 | Subpkt 2 | Subpkt 3 |
|---|---|---|---|---|---|---|---|
| 0 | 0 | 24 | 1 | Chnl 1, 2 (Sample 0) | Chnl 3, 4 (Sample 0) | Chnl 5, 6 (Sample 0) | Chnl 7, 8 (Sample 0) |
| 1 | 1 | | | Chnl 9, 10 (Sample 0) | Chnl 11, 12 (Sample 0) | Chnl 13, 14 (Sample 0) | Chnl 15, 16 (Sample 0) |
| 2 | 2 | | | Chnl 17, 18 (Sample 0) | Chnl 19, 20 (Sample 0) | Chnl 21, 22 (Sample 0) | Chnl 23, 24 (Sample 0) |

TABLE 22

3D Audio Sample Packet Layout for 32 channels

| Packet # | sequence number | Num Channels | Sample | Subpkt 0 | Subpkt 1 | Subpkt 2 | Subpkt 3 |
|---|---|---|---|---|---|---|---|
| 0 | 0 | 32 (Max) | 1 | Chnl 1, 2 (Sample 0) | Chnl 3, 4 (Sample 0) | Chnl 5, 6 (Sample 0) | Chnl 7, 8 (Sample 0) |
| 1 | 1 | | | Chnl 9, 10 (Sample 0) | Chnl 11, 12 (Sample 0) | Chnl 13, 14 (Sample 0) | Chnl 15, 16 (Sample 0) |
| 2 | 2 | | | Chnl 17, 18 (Sample 0) | Chnl 19, 20 (Sample 0) | Chnl 21, 22 (Sample 0) | Chnl 23, 24 (Sample 0) |

TABLE 22-continued

3D Audio Sample Packet Layout for 32 channels

| Packet # | sequence number | Num Channels | Sample | Subpkt 0 | Subpkt 1 | Subpkt 2 | Subpkt 3 |
|---|---|---|---|---|---|---|---|
| 3 | 3 | | | Chnl 25, 26 (Sample 0) | Chnl 27, 28 (Sample 0) | Chnl 29, 30 (Sample 0) | Chnl 31, 32 (Sample 0) |

There are four sample_present bits in the 3D Audio Sample Packet Header, one for each of the sub-packets. Each sample_present bit indicates whether a sub-packet contains a 3D Audio sample. In addition, there are four sample_flat.spX bits which are set if no useful audio data was available at the MHL Source during the time period represented by that sample. This may occur during sample rate changes or temporary stream interruptions.

Contiguous 3D Audio Sample Packets can be used to carry one 3D Audio sample which contains between 9 and 32 channels of L-PCM audio (i.e. 5 to 16 IEC 60958 frames).

The first packet of a 3D Audio sample is fully packed with 8 audio channels and has the sequence number field set to 0. The sequence number increments by one for each additional packet within the same 3D Audio sample. The final packet contains 8 or fewer audio channels depending on the total number of channels of a 3D Audio sample.

There are only five valid configurations of sample_present bits for a 3D Audio Sample Packet.

TABLE 23

Valid Sample_Present Bit Configurations for 3D Audio transmission

| SP0 | SP1 | SP1 | SP3 | Description |
|---|---|---|---|---|
| 0 | 0 | 0 | 0 | No Subpackets contain parts of the audio sample. |
| 1 | 0 | 0 | 0 | Only Subpacket 0 contains one part of the audio sample. |
| 1 | 1 | 0 | 0 | Subpackets 0 and 1 contain two contiguous parts of the audio sample. |
| 1 | 1 | 1 | 0 | Subpackets 0, 1 and 2 contain three contiguous parts of the audio sample. |
| 1 | 1 | 1 | 1 | Subpackets 0, 1, 2 and 3 contain four contiguous parts of the audio sample. |

Figure 6:
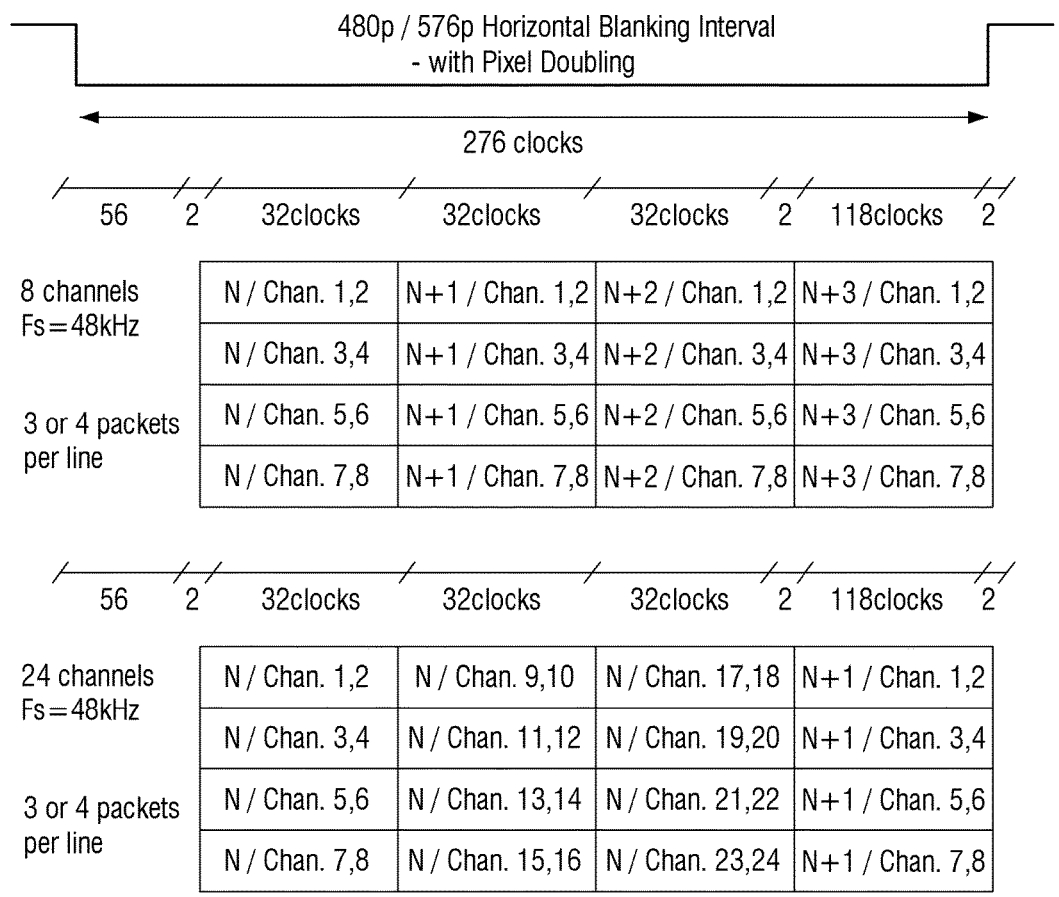
FIGS. 6 and 7 illustrate a transmission timing of a 3D audio signal.
Figure 7:
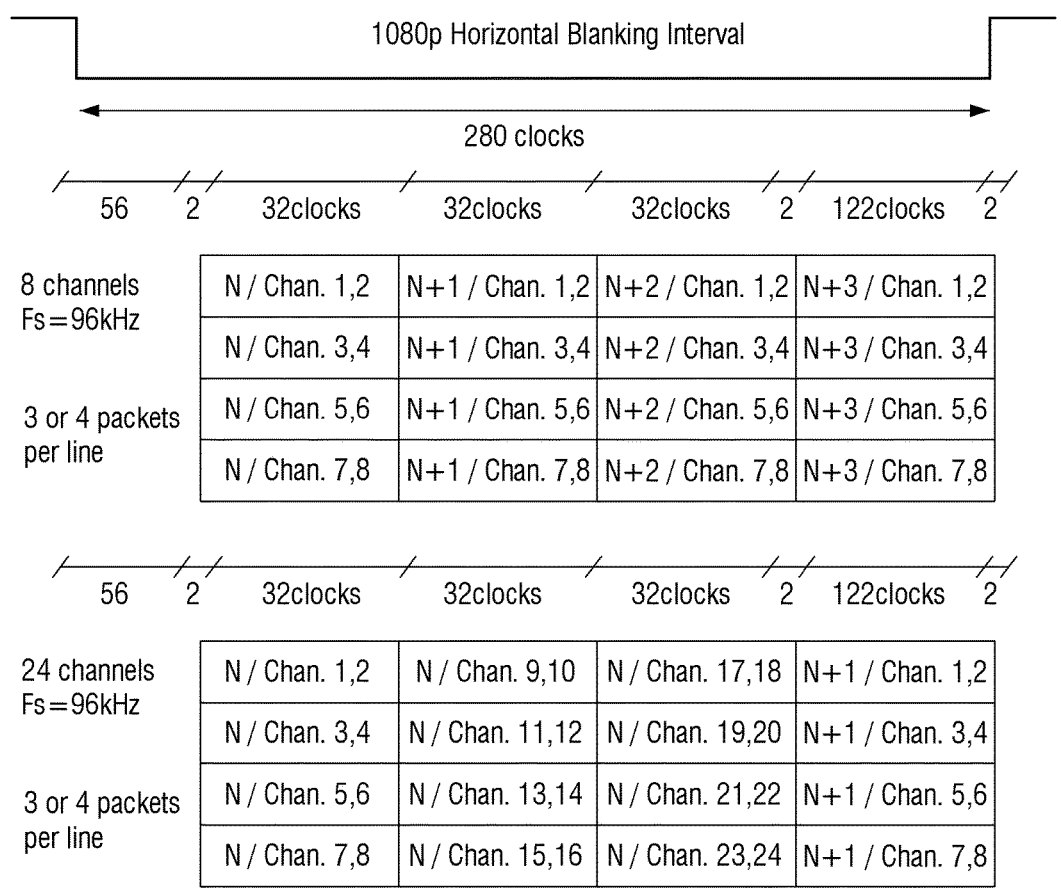

FIGS. 6 and 7 illustrate a transmission timing of a 3D audio signal.

In particular, FIGS. 6 and 7 illustrate three 8-channel 2D audio signal samples which are transmitted in a horizontal blanking interval. With the 3D audio signal of 24 channels one sample is transmitted during the same period of time.

Multi-Audio Data Packetization

MHL allows a MHL Source to concurrently transmit a number of audio streams for single AV Streaming. The multiple audio streams are associated with either a single-view or multi-view video streaming (e.g. multi-view gaming with different audio data per view). Auxiliary audio modes may also be provided, such as Split-Screen tagging (i.e., different parts of the screen are tagged and associated with its own audio stream), language codes, or audio for a visually/hearing impaired person. Each audio stream is only associated with one viewing mode and contains 2 audio channels.

A Sub-packet of a Multi-Stream Audio Sample Packet does not contain a frame defined by IEC 60958 or a block defined by IEC 61937 or contains one frame defined by IEC 60958 or one block defined by IEC 61937.

When more than four audio streams are transmitted, two or more continuous Multi-Audio Sample Packets are used to transmit the multiple audio streams. The order of each packet within the packet array is identified by the Sequence_Number field. A MHL Source can transmit up to 16 independent audio streams simultaneously within a single AV Stream.

Tables 25 and 26 show examples of Multi-Audio Sample Packet and Multi-Audio Metadata Packet layouts when a MHL Source transmits four audio streams with Single-View video streaming. Multi-Audio Metadata Packets describe the characteristics (supplementary information, language) of each audio stream.

Tables 27 and 28 show examples of Multi-Audio Sample Packet and Multi-Audio Metadata Packet layouts when a MHL Source transmits eight audio streams with dual view video streaming. Multi-Audio Metadata Packets describe the characteristics (associated view, supplementary information, language) of each audio stream.

Tables 29 and 30 show examples of Multi-Audio Sample Packet and Multi-Audio Metadata Packet layouts when a MHL Source transmits six audio streams with Split-Screen tagging option enabled for single-view video streaming.

TABLE 24

Example of Multi-Audio Sample Packet Layout with 4 audio streams in single-view mode

| Packet # | sequence number | Num Streams | Subpkt 0 | Subpkt 1 | Subpkt 2 | Subpkt 3 |
|---|---|---|---|---|---|---|
| 0 | 0 | 4 | Stream 1 (Channel 1, 2) | Stream 2 (Channel 1, 2) | Stream 3 (Channel 1, 2) | Stream 4 (Channel 1, 2) |

TABLE 25

Example of Multi-Audio Metadata Packet Layout (related to the packet in Table 24)

| Packet # | sequence number | Num Streams | Subpkt 0 | Subpkt 1 | Subpkt 2 | Subpkt 3 |
|---|---|---|---|---|---|---|
| 0 | 0 | 4 | English nomal | Korean normal | Japanese Audio for VI | Spanish Audio for HI |

Audio for HI: Audio stream for a Hearing Impaired Person
Audio for VI: Audio stream for a Visually Impaired Person

TABLE 26

Example of Multi-Audio Sample Packet Layout with 8 audio streams in dual view mode

| Packet # | sequence number | Num Streams | Subpkt 0 | Subpkt 1 | Subpkt 2 | Subpkt 3 |
|---|---|---|---|---|---|---|
| 0 | 0 | 8 | Stream 1 (Channel 1, 2) | Stream 2 (Channel 1, 2) | Stream 3 (Channel 1, 2) | Stream 4 (Channel 1, 2) |
| 1 | 1 |  | Stream 5 (Channel 1, 2) | Stream 6 (Channel 1, 2) | Stream 7 (Channel 1, 2) | Stream 8 (Channel 1, 2) |

TABLE 27

Example of Multi-Audio Metadata Packet Layout (related to the packet in Table 26)

| Packet # | sequence number | Num Streams | Subpkt 0 | Subpkt 1 | Subpkt 2 | Subpkt 3 |
|---|---|---|---|---|---|---|
| 0 | 0 | 8 | Left View English nomal | Left View Korean normal | Left View Spanish normal | Left View Spanish Audio for HI |
| 1 | 1 |  | Left View English Audio for VI | Right View Koean Audio for VI | Right View Japanese Audio for VI | Right View Chinese Audio for VI |

Audio for HI: Audio stream for a Hearing Impaired Person
Audio for VI: Audio stream for a Visually Impaired Person

TABLE 28

Example of Multi-Audio Sample Packet Layout with 6 audio streams with Split-Screen tagging (in single-view) mode

| Packet # | sequence number | Num Streams | Subpkt 0 | Subpkt 1 | Subpkt 2 | Subpkt 3 |
|---|---|---|---|---|---|---|
| 0 | 0 | 6 | Stream 1 (Channel 1, 2) | Stream 2 (Channel 1, 2) | Stream 3 (Channel 1, 2) | Stream 4 (Channel 1, 2) |
| 1 | 1 |  | Stream 5 (Channel 1, 2) | Stream 6 (Channel 1, 2) | — | — |

TABLE 29

Example of Multi-Audio Metadata Packet Layout (related to the packet in Table 28)

| Packet # | sequence number | Num Streams | Subpkt 0 | Subpkt 1 | Subpkt 2 | Subpkt 3 |
|---|---|---|---|---|---|---|
| 0 | 0 | 6 | Window 1 English normal | Window 2 Korean normal | Window 3 Spanish normal | Window 4 Japanese normal |
| 1 | 1 | | Window 5 English Audio for HI | Window 6 English Audio for VI | — | — |

Audio for HI: Audio stream for a Hearing Impaired Person
Audio for VI: Audio stream for a Visually Impaired Person 3D Audio Metadata Packetization When an active 3D Audio stream is transmitted, a 3D Audio Metadata Packet is transmitted at least once per two Video Fields.

When the transmission of a new 3D Audio stream is started or upon any change in the 3D Audio stream indicated by the 3D Audio Metadata Packet and Audio Info Frame, a modified 3D Audio Metadata Packet is transmitted no later than one video frame following the first affected non-silent audio sample. This occurs just before the first affected audio sample is transmitted.

The 3D Audio Metadata Packet transmission may occur at any time within the Data Idle period, including any horizontal or vertical blanking periods.

When 3D Audio data is streamed, the MHL Sink ignores CC and CA fields in the Audio Info Frame and instead refers to 3D_CC and 3D_CA fields in the 3D Audio Metadata Packets.

Multi-Audio Metadata Packetization

When an active Multi-Audio stream is transmitted, a Multi-Audio Metadata Packet is transmitted at least once per two Video Fields.

When the transmission of a new Multi-Audio stream is started or upon any change in the Multi-Audio stream indicated by the Multi-Audio Metadata Packet and Audio Info Frame, a modified Multi-Audio Metadata Packet is transmitted no later than one video frame following the first affected non-silent audio sample. This occurs just before the first affected audio sample is transmitted.

The Multi-Audio Metadata Packet transmission may occur at any time within the Data Idle period, including any horizontal or vertical blanking period.

WRITE_BURST Usage for 3D/Multi-Audio Support

Support for the 3D Audio mode is indicated using a sequence of WRITE_BURST transfers, formatted as shown in Tables 31 and 37.

TABLE 30

MHL 3D Audio Descriptors (3D_AD) in WRITE_BURST

| Offset | Symbol | Value Description | Notes |
|---|---|---|---|
| 0x00 | BURST_ID_H | High-order byte of Burst_ID | |
| 0x01 | BURST_ID_L | Low-order byte of Burst_ID | |
| 0x02 | CHECK_SUM | Checksum for WRITE_BURST | |
| 0x03 | TOT_DESC | Total Descriptors in Sequence | |
| 0x04 | SEQ | Sequence Index | |
| 0x05 | NUM_DESC | Number of Descriptors in this burst | |

TABLE 30-continued

MHL 3D Audio Descriptors (3D_AD) in WRITE_BURST

| Offset | Symbol | Value Description | Notes |
|---|---|---|---|
| 0x06 | AUD_DESC 1 | Indicates the audio descriptor for 3D Audio | |
| 0x07 | | | |
| 0x08 | | | |
| 0x09 | | | |
| 0x0A | AUD_DESC 2 | Indicates the audio descriptor for 3D Audio | |
| 0x0B | | | |
| 0x0C | | | |
| 0x0D | | | |
| 0x0E | TBD | TBD | |
| 0x0F | TBD | TBD | |

TABLE 31

Audio Descriptor for Audio Format Code set to 1 (LPCM)

| | Bit # | | | | | | | |
|---|---|---|---|---|---|---|---|---|
| Byte ↓ | 7 | 6 | 5 | 4 | 3 | 2 | 1 | 0 |
| 1 | 0 | 0 | 0 | 0 | Audio Format Code = 0001b | | | |
| 2 | 0 | 0 | 0 | Max Number of channels -1 | | | | |
| 3 | 0 | 192 kHz | 176.4 kHz | 96 kHz | 88.2 kHz | 48 kHz | 44.1 kHz | 32 kHz |
| 4 | 0 | 0 | 0 | 0 | 0 | 24 bit | 20 bit | 16 bit |

Table 32

Audio Descriptor for Audio Format Codes set to 2 to 8

| | Bit # | | | | | | | |
|---|---|---|---|---|---|---|---|---|
| Byte ↓ | 7 | 6 | 5 | 4 | 3 | 2 | 1 | 0 |
| 1 | 0 | 0 | 0 | 0 | Audio Format Code | | | |
| 2 | 0 | 0 | 0 | Max Number of channels -1 | | | | |
| 3 | 0 | 192 kHz | 176.4 kHz | 96 kHz | 88.2 kHz | 48 kHz | 44.1 kHz | 32 kHz |
| 4 | Maximum bit rate divided by 8 kHz | | | | | | | |

TABLE 33

3D Audio Descriptor for Audio Format Codes set to 9 to 13

| | Bit # | | | | | | | |
|---|---|---|---|---|---|---|---|---|
| Byte ↓ | 7 | 6 | 5 | 4 | 3 | 2 | 1 | 0 |
| 1 | 0 | 0 | 0 | 0 | Audio Format Code | | | |
| 2 | 0 | 0 | 0 | Max Number of channels -1 | | | | |
| 3 | 0 | 192 kHz | 176.4 kHz | 96 kHz | 88.2 kHz | 48 kHz | 44.1 kHz | 32 kHz |
| 4 | Audio Format Code dependent value | | | | | | | |

TABLE 34

3D Audio Descriptor for Audio Format Code set to 14 (WMA Pro)

| Byte | Bit # 7 | 6 | 5 | 4 | 3 | 2 | 1 | 0 |
|---|---|---|---|---|---|---|---|---|
| 1 | 0 | 0 | 0 | 0 | Audio Format Code = 1110b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHz | 32 kHz |
| 4 | Reserved (0) | | | | Profile | | | |

TABLE 35

3D Audio Descriptor for Audio Format Code set to 15 (extension)

| Byte | Bit # 7 | 6 | 5 | 4 | 3 | 2 | 1 | 0 |
|---|---|---|---|---|---|---|---|---|
| 1 | 0 | 0 | 0 | 0 | Audio Format Code = 1111b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHz | 32 kHz |
| 4 | Audio Format Code Extension | | | | 0 | 0 | 0 | 0 |

TABLE 36

MHL 3D Channel/Speaker Allocation Descriptor (3D_CSAD) in WRITE_BURST

| Offset | Symbol | Value Description | Notes |
|---|---|---|---|
| 0x00 | BURST_ID_H | High-order byte of Burst_ID | |
| 0x01 | BURST_ID_L | Low-order byte of Burst_ID | |
| 0x02 | CHECK_SUM | Checksum for WRITE_BURST | |
| 0x03 | CSA_DESC | Indicates the channel/speaker allocation descriptor for 3D Audio | |
| 0x04 | | | |
| 0x05 | | | |
| 0x06 | | | |
| 0x07 | TBD | TBD | |
| 0x08 | TBD | TBD | |
| 0x09 | TBD | TBD | |
| 0x0A | TBD | TBD | |
| 0x0B | TBD | TBD | |
| 0x0C | TBD | TBD | |
| 0x0D | TBD | TBD | |
| 0x0E | TBD | TBD | |
| 0x0F | TBD | TBD | |

TABLE 37

3D Channel Speaker Allocation Descriptor for 10.2 channel

| Byte | Bit # 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSiL/TpSiR | SiL/SiR | TpBC | LFE2 | LS/RS | TpFC | TpC | TpFL/TpFR |
| PB3 | 0 | 0 | 0 | LSd/LRd | TpLS/TpRS | BtFL/BtFR | BtFC | TpBL/TpBR |
| PB4 | 3D_CAST (=0x01) | | | | 0 | 0 | 0 | 0 |

Bold bits are the designated speakers associated with 10.2 channels.

TABLE 38

3D Channel Speaker Allocation Descriptor for a 22.2 channel

| Byte | Bit # 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSiL/TpSiR | SiL/SiR | TpBC | LFE2 | LS/RS | TpFC | TpC | TpFL/TpFR |

TABLE 38-continued

3D Channel Speaker Allocation Descriptor for a 22.2 channel

| Byte | Bit # 7 | 6 | 5 | 4 | 3 | 2 | 1 | 0 |
|---|---|---|---|---|---|---|---|---|
| PB3 | 0 | 0 | 0 | LSd/LRd | TpLS/TpRS | BtFL/BtFR | BtFC | TpBL/TpBR |
| PB4 | | 3D_CAST (=0x02) | | | 0 | 0 | 0 | 0 |

Bold bits are the designated speakers associated with 22.2 channels

TABLE 39

3D Channel Speaker Allocation Descriptor for a 30.2 channel

| Byte | Bit # 7 | 6 | 5 | 4 | 3 | 2 | 1 | 0 |
|---|---|---|---|---|---|---|---|---|
| PB1 | FLW/FRW | BLC/BRC | FLC/FRC | BC | BL/BR | FC | LFE1 | FL/FR |
| PB2 | TpSiL/TpSiR | SiL/SiR | TpBC | LFE2 | LS/RS | TpFC | TpC | TpFL/TpFR |
| PB3 | 0 | 0 | 0 | LSd/LRd | TpLS/TpRS | BtFL/BtFR | BtFC | TpBL/TpBR |
| PB4 | | 3D_CAST (=0x03) | | | 0 | 0 | 0 | 0 |

Bold bits are the designated speakers associated with 30.2 channels

TABLE 40

3D_CAST (3D Audio Channel Allocation Standard Type) field

| 3D_CAST | Description |
|---|---|
| 0x0 | Reserved |
| 0x1 | Up to 10.2 channels Based on ITU-R BS. 2159-4 (Type B, 10.2ch) |
| 0x2 | Up to 22.2 channels Based on SMPTE 2036-2 |
| 0x3 | Up to 30.2 channels Based on IEC 62574/Ed. 1Reserved |
| 0x4 | |
| ... | Reserved |
| 0xF | |

Link Control Bus

Device Register Change Interrupt

TABLE 41

Register Change Interrupt Register Details

| Register Name | Offset | 7 | 6 | 5 | 4 | 3 | 2 | 1 | 0 |
|---|---|---|---|---|---|---|---|---|---|
| RCHANGE_INT | 0x20 | | | | | | | | |

| Bit | Name | Source | Sink | | Notes |
|---|---|---|---|---|---|
| 0 | DCAP_CHG | X | X | ... | 1 |
| 1 | DSCR_CHG | X | X | ... | 2 |
| 2 | REQ_WRT | X | X | ... | 2 |
| 3 | GRT_WRT | X | X | ... | 2 |
| 4 | 3D_REQ | X | X | ... | 3 |
| 5 | 3D_AUD_REQ | X | X | Request for 3D Audio Information | 4 |
| 6-7 | | | | | |

3D_AUD_REQ is used by a MHL Source device to request the 3D Audio support information from the MHL Sink BURST_ID Codes

TABLE 42

BURST_ID Codes

| Symbol | Value | Description | Notes |
|---|---|---|---|
| 3D_VIC | 0x0010 | Indicates Video Index Codes for 3D | 1 |
| 3D_DTD | 0x0011 | Indicates Detailed Timing Descriptors for 3D | 1 |
| 3D_AD | 0x0101 | Indicates the 3D Audio Descriptors for 3D Audio | 2 |
| 3D_CSAD | 0x0110 | Indicates the 3D Channel/Speaker Allocation Descriptor for 3D Audio | 2 |

3D_AD and 3D_CSAD are used by a MHL Sink to indicate support of Audio Extension

Control and Configuration

Extended Device Capability Register

A sink apparatus may provide an extended device capability register to a source apparatus. In other words, a source apparatus may read out an extended device capability register of a sink apparatus.

As shown in Table 43, the address 0x85 of an extended device capability register of a MHL specification may be used to represent multi-audio modes supported by a sink apparatus.

TABLE 43

Extended Device Capability Register Name and Definition

| Address | Extended Device Capability Register Name | Definition |
|---|---|---|
| 0x80 | ECBUS_SPEEDS | eCBUS Frequencies |
| 0x81 | TMDS_SPEEDS | TMDS Frequencies |
| 0x82 | ECBUS_TDM_SUPPORTED | Number of supported eCBUS TDM channels. |

TABLE 43-continued

Extended Device Capability Register Name and Definition

| Address | Extended Device Capability Register Name | Definition |
|---|---|---|
| 0x83 | ECBUS_USB_ROLES | Indicates USB roles supported by this device. |
| 0x84 | CABLE_REPORT | Indicates the type of cable detected at Sink. |
| 0x85 | MULTI_AUD_MODE | Indicates the Multi-Audio modes supported by Sink. |

Multi-Audio Mode

Each MHL Sink device indicates in the MULTI_AUD_MODE register the specific Multi-Audio Mode it supports.

The MULTI_AUD_MODE register includes a split-screen audio field which indicates whether a sink apparatus supports receiving and processing of multi-audio data related to a split-screen.

TABLE 44

MULTI_AUD_MODE Register Details

| Register Name | Offset | 7 6 5 4 | 3 | 2 | 1 | 0 |
|---|---|---|---|---|---|---|
| MULTI_AUD_MODE | 0x85 | Reserved | SUPP_AUD_LANG | SUPP_AUD_SUPPL | SUPP_AUD_SPLIT | SUPP_AUD_MV |

| Bit | Name | | Notes |
|---|---|---|---|
| 0 | SUPP_AUD_MV | Supports Multi-View Multi-Audio mode | 1 |
| 1 | SUPP_AUD_SC | Supports Split-Screen tagging | |
| 2 | SUPP_AUD_SUPPL | Supports Supplementary Audio mode (e.g., audio for a visually/hearing impaired person) | |
| 3 | SUPP_AUD_LANG | Supports Multi-language Audio | |
| 7:4 | | Reserved | |

If a device is not capable of supporting Multi-View video streaming, the MULTI_AUD_MODE Register field is set to 0.

Multi-Stream Audio

Exemplary embodiments of multi-stream audio transmissions will now be described. The multi-stream audio transmission specification may be applied to various wired/wireless transmission interfaces including HDMI and MHL.

A source apparatus according to an exemplary embodiment may transmit 4 audio streams simultaneously. All audio streams share one Info Frame with respect to a multi-stream audio sample packet.

A wired interface according to the exemplary embodiments may support single-view video streaming (for example, multi-lingual support, audio for a visually/hearing impaired person, etc., which may be performed by modifying an audio metadata packet or by modifying a HDMI audio data block.

For example, as shown in Table 45, multi-stream audio may support multi-languages, and the audio may support 2 channels.

TABLE 45

Overview of Supports of Multi-stream Audio for single-view

| Audio Feature | Application | Audio Ch. | Feature Req. | Metadata | Notes |
|---|---|---|---|---|---|
| 3D Audio | UHD 4k, cinema | 9~32ch. | Optional | Speaker Alloc. | |
| Multi-stream Audio (multi-view) | Dual-view gaming | Max. 2ch. | Optional | Video(field) mapping | Max. 4 streams |
| Multi-stream Audio (single-view) | Multi-lingual support | Max. 2ch. | Optional | Language code | Max. 4 streams |
| | Video(Audio) Description | Max. 2ch. | Optional | Indicator | Max. 4 streams |

Scenarios

Figure 8:
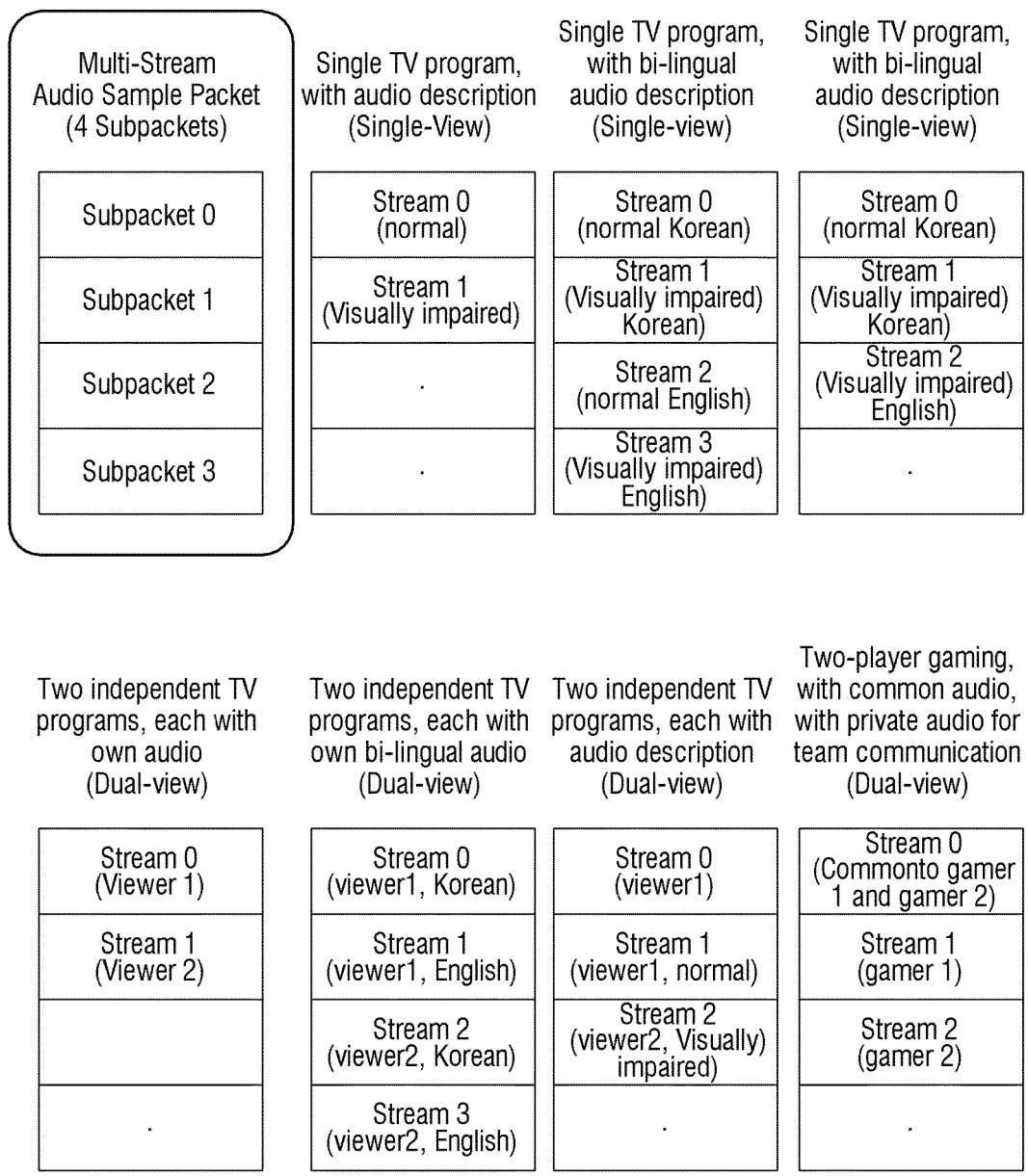
FIG. 8 illustrates scenarios of multi-stream audio sample packets according to an exemplary embodiment.

FIG. 8 illustrates scenarios of multi-stream audio sample packets according to an exemplary embodiment.

When a multi-stream audio sample packet includes four sub-packets, the following scenarios are supported:

First, when a single television program is transmitted along with an audio description for single-view, stream 0 may include a normal audio signal, and stream 1 may include an audio description signal for a visually impaired person.

Second, when the single-view supports two languages, two audio signal streams in the supported languages are transmitted along with the corresponding audio descriptions. For example, if English language and Korean language are supported, stream 0 may include a Korean language normal audio signal, stream 1 may include a Korean language audio description signal for a visually impaired person, stream 2 may include an English language normal audio signal, and stream 3 may include an English language audio description signal for the visually impaired person.

Third, in single-view, one audio signal stream in one language and two description signals for the visually impaired person in two different languages may be transmitted, For example, stream 0 may include a Korean language or an English language normal audio signal, stream 1 may include a Korean language audio description signal for a visually impaired person, and stream 2 may include an English language audio description signal for the visually impaired person.

Fourth, a source apparatus may transmit an audio signal for multi-view. If multi-view is supported, an audio signal may be transmitted in one transmission stream with respect to each view. A multi-view includes first and second independent views, and each view provides an independent content.

Fifth, two languages may be supported for each view. An audio signal stream in a first language with respect to a first view, an audio signal stream in a second language with respect to the first view, an audio signal stream in the first language with respect to a second view, and an audio signal stream in the second language with respect to the second view may be transmitted. If the English language and the Korean language are the supported languages, stream 0 may include a Korean language audio signal with respect to the first view, stream 1 may include an English language audio signal with respect to the first view, stream 2 may include a Korean language audio signal with respect to the second view, and stream 3 may include an English language audio signal with respect to the second view.

Sixth, when multi-view is supported, one view may further transmit an audio description signal for the visually impaired person. An audio signal stream with respect to the first view, a normal audio signal stream with respect to the second view, and an audio description signal stream for the visually impaired person with respect to the second view may be transmitted. Stream 0 may include an audio signal with respect to the first view, stream 1 may include an audio signal with respect to the second view, and stream 3 may include an audio description signal with respect to the second view.

Seventh, one stream may be used to transmit a common audio signal. A common audio signal stream with respect to the first view and the second view, an audio stream exclusive for the first view, and an audio stream exclusive for the second view may be transmitted. In this case, a receiving end multiplexes and outputs the common audio stream and the exclusive audio stream. Such a scenario may be applied to a game. For example, stream 0 may include a common audio signal (for example, background sound, progress guidance voice, etc.) with respect to the first view and the second view, stream 1 may include an audio signal exclusive for the first view, and stream 2 may include an audio signal exclusive for the second view.

Figure 9:
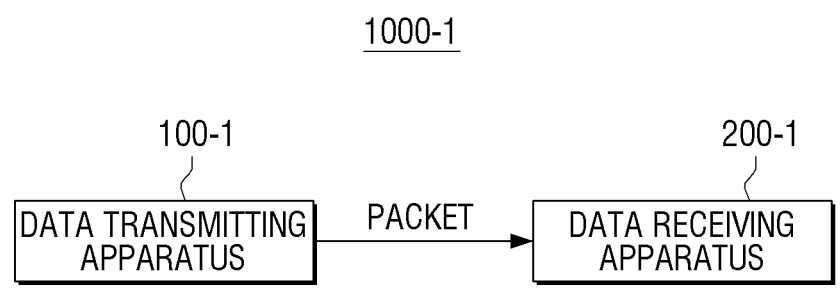
FIG. 9 is a block diagram illustrating a data transceiving system according to an exemplary embodiment.

FIG. 9 is a block diagram illustrating a data transceiving system 1000-1 according to an exemplary embodiment.

Referring to FIG. 9, the data transceiving system 1000-1 according to an exemplary embodiment includes a data transmitting apparatus 100-1 and a data receiving apparatus 200-1.

The data transmitting apparatus 100-1 transmits a packet including a first sub packet and a second sub packet to the data receiving apparatus 200-1.

The data receiving apparatus 200-1 receives the packet including a first sub packet and a second sub packet from the data transmitting apparatus 100-1.

The first sub packet and the second sub packet include different audio data related to a first content.

The configurations of the data transmitting apparatus 100-1 and the data receiving apparatus 200-1 will now be described in greater detail.

Figure 10:
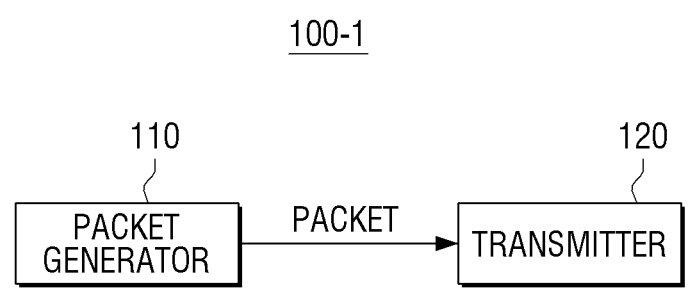
FIG. 10 is a block diagram illustrating a data transmitting apparatus according to another exemplary embodiment.

FIG. 10 is a block diagram illustrating the data transmitting apparatus 100-1 according to an exemplary embodiment.

Referring to FIG. 10, the data transmitting apparatus 100-1 according to an exemplary embodiment includes a packet generator 110 and a transmitter 120.

The packet generator 110 generates a packet including a first sub packet and a second sub packet. The first sub packet and the second sub packet include different audio data related to a first content.

The transmitter 120 transmits the generated packet to the receiving apparatus 200-1. The first sub packet may include audio data for a non-disabled person, and the second sub packet may include audio data for a visually impaired person.

The first sub packet and the second sub packet may include audio data in different languages.

The first sub packet may include audio data corresponding to an audio description with respect to the second sub packet.

The packet may further include a third sub packet including audio data with respect to a second content which are different from the first content.

The audio data included in the first sub packet may be audio data is exclusively provided for the first content, the audio data included in the third sub packet may be audio data exclusively provided for the second content, and the audio data included in the second sub packet may be common audio data with respect to the first content and the second content.

In addition, the packet may further include a fourth sub packet including audio data with respect to the second content, and the third sub packet and the fourth sub packet may include different audio data.

Figure 11:
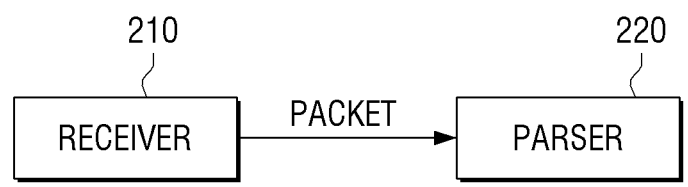
FIG. 11 is a block diagram illustrating a data receiving apparatus according to an exemplary embodiment.

FIG. 11 is a block diagram illustrating a data receiving apparatus 200-1 according to an exemplary embodiment.

Referring to FIG. 11, the data receiving apparatus 200-1 according to an exemplary embodiment includes a receiver 210 and a parser 220.

The receiver 210 receives a packet including a first sub packet and a second sub packet from the data transmitting apparatus 100-1. The first sub packet and the second sub packet may include different audio data related to the first content.

The parser 220 is an element to parse the received first sub packet and the received second sub packet.

The first sub packet and the second sub packet may include audio data in different languages.

The first sub packet may include audio data corresponding to an audio description with respect to the second sub packet.

The packet may further include a third sub packet including audio data with respect to a second content which is different from the first content.

The audio data included in the first sub packet may be audio data exclusively provided for the first content, the audio data included in the third sub packet may be audio data exclusively provided for the second content, and the audio data included in the second sub packet may be common audio data related to the first content and the second content In addition, the packet may further include a fourth sub packet including audio data with respect to the second content, and the third sub packet and the fourth sub packet may include different audio data.

Audio Metadata Packet

A source apparatus transmits an audio metadata packet to a sink apparatus in accordance with an audio specification. A header of the audio metadata packet may have the following structure.

TABLE 46

| | | | | | | | | |
|---|---|---|---|---|---|---|---|---|
| Audio Metadata Packet Header | | | | | | | | |
| | Bit# | | | | | | | |
| Byte | 7 | 6 | 5 | 4 | 3 | 2 | 1 | 0 |
| HB0 | 0 | 0 | 0 | 0 | 1 | 1 | 0 | 1 |
| HB1 | Rsvd(0) | Rsvd(0) | Rsvd(0) | Rsvd(0) | Rsvd(0) | Rsvd(0) | Rsvd(0) | 3D_Audio |
| HB2 | Rsvd(0) | Rsvd(0) | Rsvd(0) | Rsvd(0) | NUM_AUDIO_STR | | NUM_VIEWS | |

The descriptions of each field are as follows.

If the 3D audio field (3D_AUDIO) [1 bit] is set to 1, the audio metadata packet includes a 3D audio channel count field (3D_CC) a channel/speaker allocation information field and an Audio Channel Allocation Standard Type (ACAST) field. When a source transmits a 3D audio packet, the ACAST field may be set to 1.

The view number field (NUM_VIEWS) [2 bits] indicates the number of views. If NUM_VIEWS is set to 0, single-view video streaming is supported. If NUM_VIEWS is set to 1, multi-view video streaming is supported. This mode is permitted only when 3D_DualViewis set to 1 in VSIF. The remaining NUM_VIEWS values are reserved for future use.

The audio stream number field (NUM_AUDIO_STR) [2 bits] indicates the number of audio streams. If NUM_AUDIO_STR is set to 1, 10, or 11, the audio metadata packet includes up to four audio meta descriptors which correspond to audio streams.

TABLE 47

| | | | | |
|---|---|---|---|---|
| Valid combinations | | | | |
| 3D_AUDIO | NUM_VIEWS | NUM_AUDIO_STR | | Description |
| 1 | 0 | 0 | 0 | 0 | 3D Audio |
| 0 | 0 | 0 | 0 | 1 | Multi-Stream |
| 0 | 0 | 0 | 1 | 0 | Audio |
| 0 | 0 | 0 | 1 | 1 | (single-view) |
| 0 | 0 | 1 | 0 | 1 | Multi-Stream |
| 0 | 0 | 1 | 1 | 0 | Audio |
| 0 | 0 | 1 | 1 | 1 | (dual-view) |
| else | | | | Reserved |

Table 47 defines a payload of an audio metadata packet for 3D audio. If 3D_Audio is set to 1, the metadata packet payload has the following structure.

TABLE 48

Audio Metadata Packet Payload(3D_AUDIO set to 1)

| Byte | Bit# 7 | 6 | 5 | 4 | 3 | 2 | 1 | 0 |
|---|---|---|---|---|---|---|---|---|
| PB0 | Rsvd(0) | Rsvd(0) | Rsvd(0) | 3D_CC4 | 3D_CC3 | 3D_CC2 | 3D_CC1 | 3D_CC0 |
| PB1 | Rsvd(0) | Rsvd(0) | Rsvd(0) | Rsvd(0) | ACAT3 | ACAT2 | ACAT1 | ACAT0 |
| PB2 | 3D_CA7 | 3D_CA6 | 3D_CA5 | 3D_CA4 | 3D_CA3 | 3D_CA2 | 3D_CA1 | 3D_CA0 |
| PB3~PB27 | Reserved(0) | | | | | | | |

A 3D_CC field indicating 3D audio channel count information and an ACAST field indicating an audio channel allocation standard type are provided by a source.

Table 49 shows audio channels according to a 3D_CC value, and Table 50 indicates audio channel allocation standard types according to an ACAST field value.

TABLE 49

3D_CC field

| 3D_CC4 | 3D_CC3 | 3D_CC2 | 3D_CC1 | 3D_CC0 | Audio Channel Count |
|---|---|---|---|---|---|
| 0 | 0 | 0 | 0 | 0 | Refer to Stream Header |
| 0 | 0 | 0 | 0 | 1 | 2 channels |
| 0 | 0 | 0 | 1 | 0 | 3 channels |
| 0 | 0 | 0 | 1 | 1 | 4 channels |
| 0 | 0 | 1 | 0 | 0 | 5 channels |
| 0 | 0 | 1 | 0 | 1 | 6 channels |
| 0 | 0 | 1 | 1 | 0 | 7 channels |
| 0 | 0 | 1 | 1 | 1 | 8 channels |
| 0 | 1 | 0 | 0 | 0 | 9 channels |
| 0 | 1 | 0 | 0 | 1 | 10 channels |
| 0 | 1 | 0 | 1 | 0 | 11 channels |
| 0 | 1 | 0 | 1 | 1 | 12 channels |
| — | — | — | — | — | |
| 1 | 1 | 1 | 1 | 1 | 32 channels |

TABLE 50

Audio Channel Allocation Standard Type Field

| ACAT3 | ACAT2 | ACAT1 | ACAT0 | Description |
|---|---|---|---|---|
| 0 | 0 | 0 | 0 | Reserved |
| 0 | 0 | 0 | 1 | Refer to 10 2 channels (TTA Standard) |
| 0 | 0 | 1 | 0 | Refer to 22 2 channels (SMPTE2036-2) |
| 0 | 0 | 1 | 1 | Refer to 30 2 channels (IEC62574/Ed 1) |
| 0 | 1 | 0 | 0 | reserved |
| 1 | 1 | 1 | 1 | |

Table 51 shows payloads of an audio metadata packet for multi-stream audio. If 3D_Audio is set to 0, the metadata packet payload has the following structure.

TABLE 51

Audio Metadata Packet Payload (3D_AUDIO set to 0)

| Byte | Bit# 7 | 6 | 5 | 4 | 3 | 2 | 1 | 0 |
|---|---|---|---|---|---|---|---|---|
| PB0~PB4 | Audio_Metadata_Descriptor_0 | | | | | | | |
| PB5~PB9 | Audio_Metadata_Descriptor_1 | | | | | | | |
| PB10~PB14 | Audio_Metadata_Descriptor_2 | | | | | | | |
| PB15~PB19 | Audio_Metadata_Descriptor_3 | | | | | | | |
| PB20~PB27 | Reserved(0) | | | | | | | |

As illustrated in Table 51, the payload of the audio metadata packet includes a 5-byte for audio meta data descriptors. The audio metadata descriptor (4 fields, 5 byte for each) indicates audio metadata with respect to sub packet X in a multi-stream audio sample packet or audio metadata with respect to sub packet X in a multi-stream one bit audio sample packet. The structure of the audio metadata descriptor will be described below.

TABLE 52

Audio Metadata Descriptor (with respect to each sub packet X in multi-stream ASP)

| PB(N + 0) | Emergency_Channel | Rsvd(0) | Rsvd(0) | Rsvd(0) | Rsvd(0) | Rsvd(0) | Multiview_Right | Multiview_Left |
|---|---|---|---|---|---|---|---|---|
| PB(N + 1) | LC_Valid | Rsvd(0) | Rsvd(0) | Suppl_A_Valid | Suppl_A_Mixed | | Suppl_A_Type | |
| PB(N + 2) | Language_Code(3 Bytes) | | | | | | | |
| PB(N + 3) | | | | | | | | |
| PB(N + 4) | | | | | | | | |

The descriptions of each field are as follows.

When the emergency channel field (Emergency_Channel) [1 bit] is set to 1, a corresponding audio stream transmits emergency warning audio data. A receiving apparatus may be informed that there is emergency broadcasting through a script, etc, and an emergency warning audio signal which is received through a selection of audio may be output to a user.

When the multi-view field (left) (Multiview_Left) [1 bit] is set to 1, a corresponding audio stream is mapped with a left stereoscopic image in a 3D video format. If Multiview_Left is set to 0, the field is valid only when NUM_VIEWS is set to 1.

When Multiview_Right is set to 1, a corresponding audio stream is mapped with a right stereoscopic image in a 3D video format. When Multiview_Right is set to 0, the field is valid only when NUM_VIEWS is set to 1.

When the language code valid field (LC_Valid) [1 bit] is set to 1, the language code is valid, and the language of a corresponding audio stream is identified. Otherwise, the language of a corresponding audio steam is considered as not being specified.

When the supplemental audio valid field (Suppl_A_Valid) [1 bit] is set to 1, a corresponding audio stream includes a supplemental audio track which is indicated by Suppl_A_Type.

When the pre-mixed supplemental audio field (Suppl_A_Mixed) [1 bit] is set to 1, a corresponding audio stream may include a pre-mixed supplemental audio track indicated by a main audio component and Suppl_A_Type. The bit is valid only when Suppl_A_Valid is set to 1.

The supplemental audio type field (Suppl_A_Type) [3 bits] indicates a supplemental audio type defined in Table 53. The field is valid only when Suppl_A_Valid is set to 1. Table 53 indicates the description of a supplemental audio type field value.

The language (Language_Code) [3 Bytes] identifies the language of a corresponding audio stream. The language code is defined by ISO639. In addition, three character codes are provided, and the last character code is identical to the last byte of audio metadata descriptor X (Audio_Metadata_Descriptor_X). This field is valid only when LC_Valid is set to 1.

TABLE 53

SUPPL_A_TYPE field

| SUPPL_A_TYPE | | | Description |
|---|---|---|---|
| 0 | 0 | 0 | Reserved |
| 0 | 0 | 1 | Audio for visually impaired (contains narrative description of content) |
| 0 | 1 | 0 | Audio for visually impaired (spoken subtitles) |
| 0 | 1 | 1 | Audio for visually impaired (enhanced intelligibility of dialogue) |
| else | | | Reserved |

Figure 12:
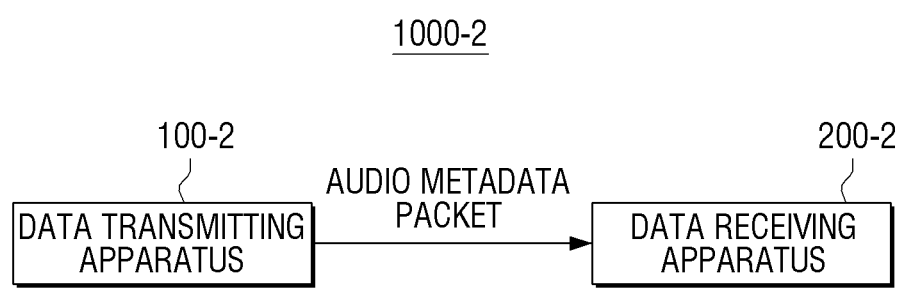
FIG. 12 is a block diagram illustrating a data transceiving system according to another exemplary embodiment.

FIG. 12 is a block diagram illustrating a data transceiving system 1000-2 according to another exemplary embodiment.

Referring to FIG. 12, the data transceiving system 1000-2 according to the exemplary embodiment includes a data transmitting apparatus 100-2 and a data receiving apparatus 200-2.

The data transmitting apparatus 100-2 generates an audio metadata packet and transmits the generated audio metadata packet to the data receiving apparatus 200-2.

The data receiving apparatus 200-2 receives the audio metadata packet from the data transmitting apparatus 100-2. A header of the audio metadata packet includes a 3D audio field indicating whether a 3D audio sample packet is transmitted.

Configurations of the data transmitting apparatus 100-2 and the data receiving apparatus 200-2 and the configuration of the audio metadata packet will be described in greater detail.

Figure 13:
FIG. 13 is a block diagram illustrating a data transmitting apparatus according to another exemplary embodiment.

As shown in FIG. 13, the data transmitting apparatus 100-2 according to another exemplary embodiment includes the packet generator 110 and the transmitter 120.

The packet generator 110 generates an audio metadata packet. A header of the generated audio metadata packet may include a 3D audio field indicating whether a 3D audio sample packet is transmitted.

The transmitter 120 transmits the generated audio metadata packet to the data receiving apparatus 200-2.

In addition, the header of the generated audio metadata packet may further include an audio stream number field (Number Of Audio Stream Field) containing audio stream number information.

The header of the generated audio metadata packet may further include a view number field (Number Of Views Field) containing information about the number of different contents which are transmitted.

A payload of the generated audio metadata packet may include an audio metadata descriptor field containing metadata regarding a sub packet of a multi-stream audio sample packet or a multi-stream one bit audio sample packet.

The audio metadata descriptor field includes at least one of an emergency channel field indicating whether there is an emergency broadcasting, a multi-view field indicating whether audio data corresponding to a left-eye image or a right-eye image is included in a multi-view, a language code valid field indicating whether a language of audio data is identified, a supplemental audio valid field indicating whether there is supplemental audio data, a pre-mixed supplemental audio field indicating whether a main audio data and the supplemental audio data are pre-mixed, a supplemental audio type field indicating a type of the supplemental audio data, and a language code field indicating a language code of audio data.

Figure 14:
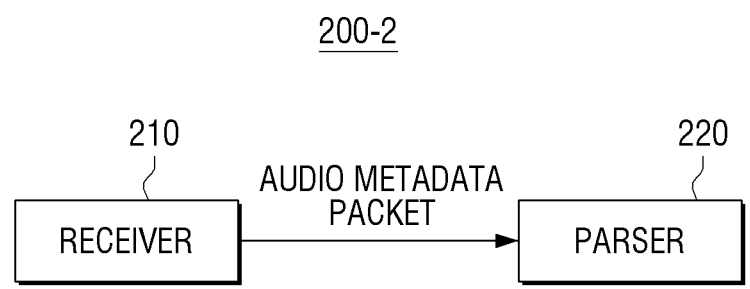
FIG. 14 is a block diagram illustrating a data receiving apparatus according to another exemplary embodiment.

FIG. 14 is a block diagram illustrating a data receiving apparatus 200-2 according to another exemplary embodiment.

Referring to FIG. 14, the data receiving apparatus 200-2 according to the exemplary embodiment includes a receiver 210 and a parser 220.

The receiver 210 is configured to receive an audio metadata packet from the data transmitting apparatus 100-2. A header of the audio metadata packet includes a 3D audio field indicating whether a 3D audio sample packet is transmitted.

The parser 220 is configured to parse the received audio metadata packet.

In addition, the header of the audio metadata packet may further include an audio stream number field (Number Of Audio Stream Field) containing information about the number of audio streams which are received.

The header of the audio metadata packet may further include a view number field (Number Of Views Field) containing information about the number of different contents which are received.

A payload of the audio metadata packet may include an audio metadata descriptor field indicating metadata regarding a sub packet of a multi-stream audio sample packet or a multi-stream one bit audio sample packet.

The audio metadata descriptor field may include at least one of an emergency channel field indicating whether there is an emergency broadcasting, a multi-view field indicating whether audio data corresponding to a left-eye image or a right-eye image is included in a multi-view, a language code valid field indicating whether a language of audio data is identified, a supplemental audio valid field indicating whether there is supplemental audio data, a pre-mixed supplemental audio field indicating whether a main audio data and the supplemental audio data are pre-mixed, a supplemental audio type field indicating a type of the supplemental audio data, and a language code field indicating a language code of audio data.

Audio Data Block

Table 54 describes an audio data block of Extended Display Identification Data (EDID). The portions regarding bytes 3-4 in Table 54 are redefined as shown in Table 54.

The short audio descriptor (SAD) for multi-stream audio is deleted and instead, a normal SAD defined in EDID is used. According to the added feature, up to two channels may be transmitted.

TABLE 54

HDMI Audio Data Block

| Byte | Bit# 7 | 6 | 5 | 4 | 3 | 2 | 1 | 0 |
|---|---|---|---|---|---|---|---|---|
| 1 | Tag code = 7 (Use Extended Tag) | | | | L = Length of following data block payload (in bytes) | | | |
| 2 | Extended Tag Code = 18(0x12) | | | | | | | |
| 3 | NUM_HDMI_3D_AD(=X) | | | | ~~NUM_CCA_SAD(=Y)~~ | | Max_Stream_Count − 1 | |
| (4)~(7) | (if NUM_HDMI_3D_AD >0) HDMI_3D_AD_1 | | | | | | | |
| ... | ... | | | | | | | |
| (4 * X)~(4 * X + 3)° | (if NUM_HDMI_3D_AD >0) HDMI_3D_AD_X | | | | | | | |
| (4 * X + 4)~(4 * X + 7) | (if NUM_HDMI_3D_AD >0) HDMI_3D_SAD | | | | | | | |
| (N + 1°°)~(N + 3) | (if Max_Stream_Count − 1 >0 and NUM_CEA_SAD >0) CEA_SAD_1 | | | | | | | |
| ... | ... | | | | | | | |
| (L − 1)~(L + 1) | (if Max_Stream_Count − 1 >0 and NUM_CEA_SAD >0) CEA_SAD_Y | | | | | | | |

Table 55 shows the configuration of a block which replaces bytes 3-4 of the above audio data block.

TABLE 55

Byte 3-4 of HDMI Audio Data Block

| Byte | Bit# 7 | 6 | 5 | 4 |
|---|---|---|---|---|
| 3 | Supports_MS_Emergency | Rsvd(0) | Supports_MS_Mix | Supports_MS_Suppl |
| 4 | Rsvd(0) | Rsvd(0) | Rsvd(0) | Rsvd(0) |

| Byte | Bit# 3 | 2 | 1 | 0 |
|---|---|---|---|---|
| 3 | Supports_MS_Lang | Supports_MS_Multiview | Max_Stream_Count − 1 | |
| 4 | Rsvd(0) | NUM_HDMI_3D_AD(=X) | | |

The descriptions of each field are as follows.

When the emergency channel field (Supports_MS_Emergency) [1 bit] is set to 1, a sink apparatus supports receiving and processing an emergency warning audio channel. When Supports_MS_Emergency is set to 0, the sink apparatus does not support the above operations.

When the audio mix field (Supports_MS_Mix) [1 bit] is set to 1, a sink apparatus supports compositing main audio and supplementary audio. When Supports_MS_Mix is set to 0, the sink apparatus does not support the compositing and supports only reproducing mixed audio.

When the supplemental audio support field (Supports_MS_Supple) [1 bit] is set to 1, the sink apparatus supports multi-stream audio having a supplemental audio track for the visually/hearing impaired person. When Supports_MS_Supple is set to 0, the sink apparatus does not support a supplemental audio track for the visually/hearing impaired person.

When the language support field (Supports_MS_Lang) [1 bit] is set to 1, the sink apparatus supports multi-stream audio having various language audio streams. When Supports_MS_Lang is set to 0, the sink apparatus does not support various language audio streams.

When the multi-view audio support field (Supports_MS_MultiView) [1 bit] is set to 1, the sink apparatus supports multi-stream audio for multi-view video streaming. When Supports_MS_MultiView is set to 0, the sink apparatus does not support multi-stream audio for multi-view video streaming.

The maximum stream count field (Max_Stream_Count-1) [2 bits] indicates the maximum number of audio streams handled by a sink apparatus. The field Max_Stream_Count-1 field is described in Table 56.

The audio descriptor number field NUM_HDMI_3D_AD) [3 bits] indicates the number of 3D audio descriptors.

TABLE 56

| Max_Stream_Count-1 field | |
|---|---|
| Max_Stream_Count-1 | Description |
| 00 | Do not Support Multi-Stream Audio |
| 01 | 2 audio streams |
| 10 | 3 audio streams |
| 11 | 4 audio streams |

Figure 15:
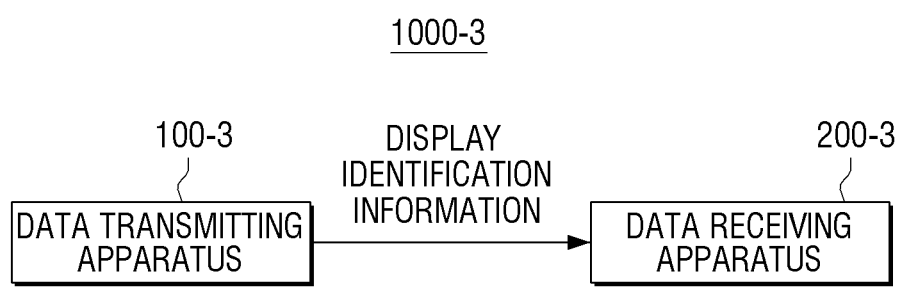
FIG. 15 is a block diagram illustrating a data transceiving system according to another exemplary embodiment.

FIG. 15 is a block diagram illustrating a data transceiving system 1000-3 according to another exemplary embodiment.

Referring to FIG. 15, the data transceiving system 1000-3 according to the exemplary embodiment includes a data transmitting apparatus 100-3 and a data receiving apparatus 200-3.

The data transmitting apparatus 100-3 generates display identification information including information on properties supported by a sink apparatus with respect to audio data, and transmits the generated information to the data receiving apparatus 200-3.

The data receiving apparatus 200-3 receives the display identification information from the data transmitting apparatus 100-3 and analyzes the information. The display identification information includes a main/supplemental audio properties field indicating information on properties of main audio and supplemental audio supported by the sink apparatus.

The data transmitting apparatus 100-3 and the data receiving apparatus 200-3 will now be described in greater detail.

Figure 16:
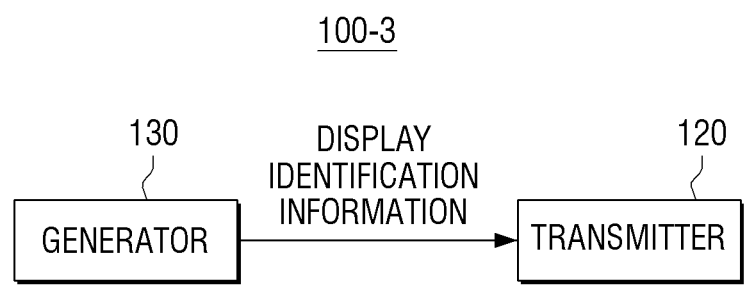
FIG. 16 is a block diagram illustrating a data transmitting apparatus according to another exemplary embodiment.

FIG. 16 is a block diagram illustrating the data transmitting apparatus 100-3 according to another exemplary embodiment.

Referring to FIG. 16, the data transmitting apparatus 100-3 according to the exemplary embodiment includes a generator 130 and the transmitter 120.

The generator 130 generates display identification information including information on properties supported by a sink apparatus with respect to audio data.

The transmitter 120 transmits the display identification information to the data receiving apparatus 200-3.

The display identification information includes a main/supplemental audio properties field indicating information on properties of main audio and supplemental audio supported by the sink apparatus.

The main/audio properties field includes at least one of an audio mix field indicating whether the sink apparatus supports composition of main audio and supplemental audio, a supplemental audio support field indicating whether the sink apparatus supports supplemental audio, a language support field indicating whether the sink apparatus supports audio data in a plurality of languages, a multi-view audio support field indicating whether the sink apparatus supports multi-stream audio data for a multi-view content, a maximum stream count field indicating a number of maximum audio streams which is handled by the sink apparatus, and an audio descriptor number field indicating a number of 3D audio descriptors.

The display identification information may further include an emergency channel field indicating whether the sink apparatus supports receiving and processing of emergency broadcasting.

Figure 17:
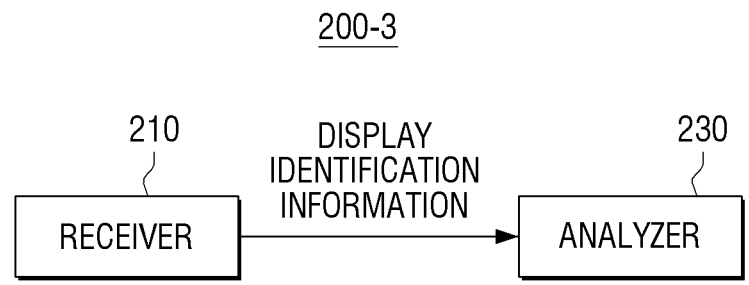
FIG. 17 is a block diagram illustrating a data receiving apparatus according to another exemplary embodiment.

FIG. 17 is a block diagram illustrating a data receiving apparatus 200-3 according to another exemplary embodiment.

Referring to FIG. 17, the data transmitting apparatus 100-3 according to the exemplary embodiment includes a receiver 210 and an analyzer 230.

The receiver 210 receives from the data transmitting apparatus 100-3 display identification information including information on properties supported by a sink apparatus with respect to audio data.

The analyzer 230 analyzes the received display identification information.

The display identification information includes a main/supplemental audio properties field providing information about properties of main audio and supplemental audio supported by the sink apparatus.

The main/audio properties field includes at least one of an audio mix field indicating whether the sink apparatus supports a composition of main audio and supplemental audio, a supplemental audio support field indicating whether the sink apparatus supports supplemental audio, a language support field indicating whether the sink apparatus supports audio data in a plurality of languages, a multi-view audio support field indicating whether the sink apparatus supports multi-stream audio data for a multi-view content, a maximum stream count field indicating a number of maximum audio streams which is handled by the sink apparatus, and an audio descriptor number field indicating a number of 3D audio descriptors.

The display identification information may further include an emergency channel field indicating whether the sink apparatus supports receiving and processing of emergency broadcasting.

A wired interface according to various exemplary embodiments may support transmission of quid view content. A 3D video format standard of HDMI wired interface standard may be used for quid view transmission.

Figure 18A:
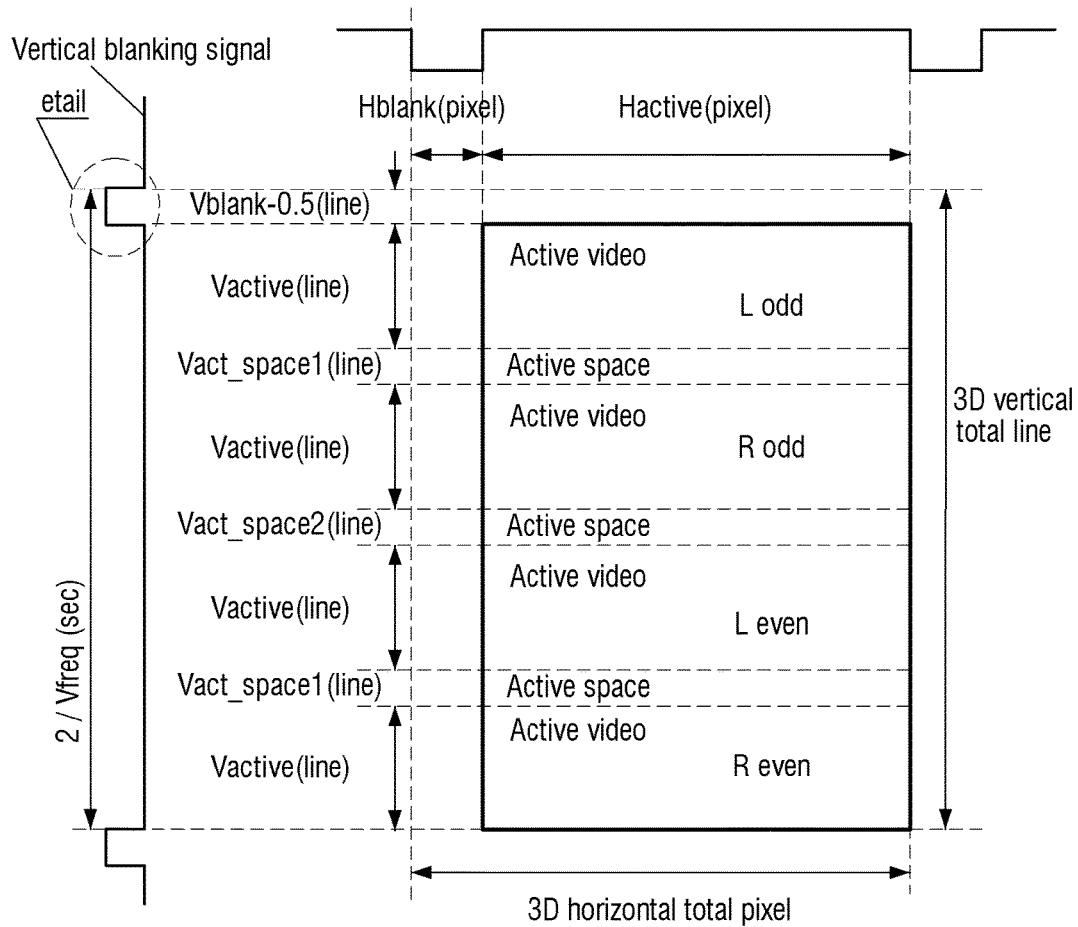
FIGS. 18A, 18B and 18C illustrate various data transmitting formats for transmitting quad view video content in a 3D interlace format.
Figure 18B:
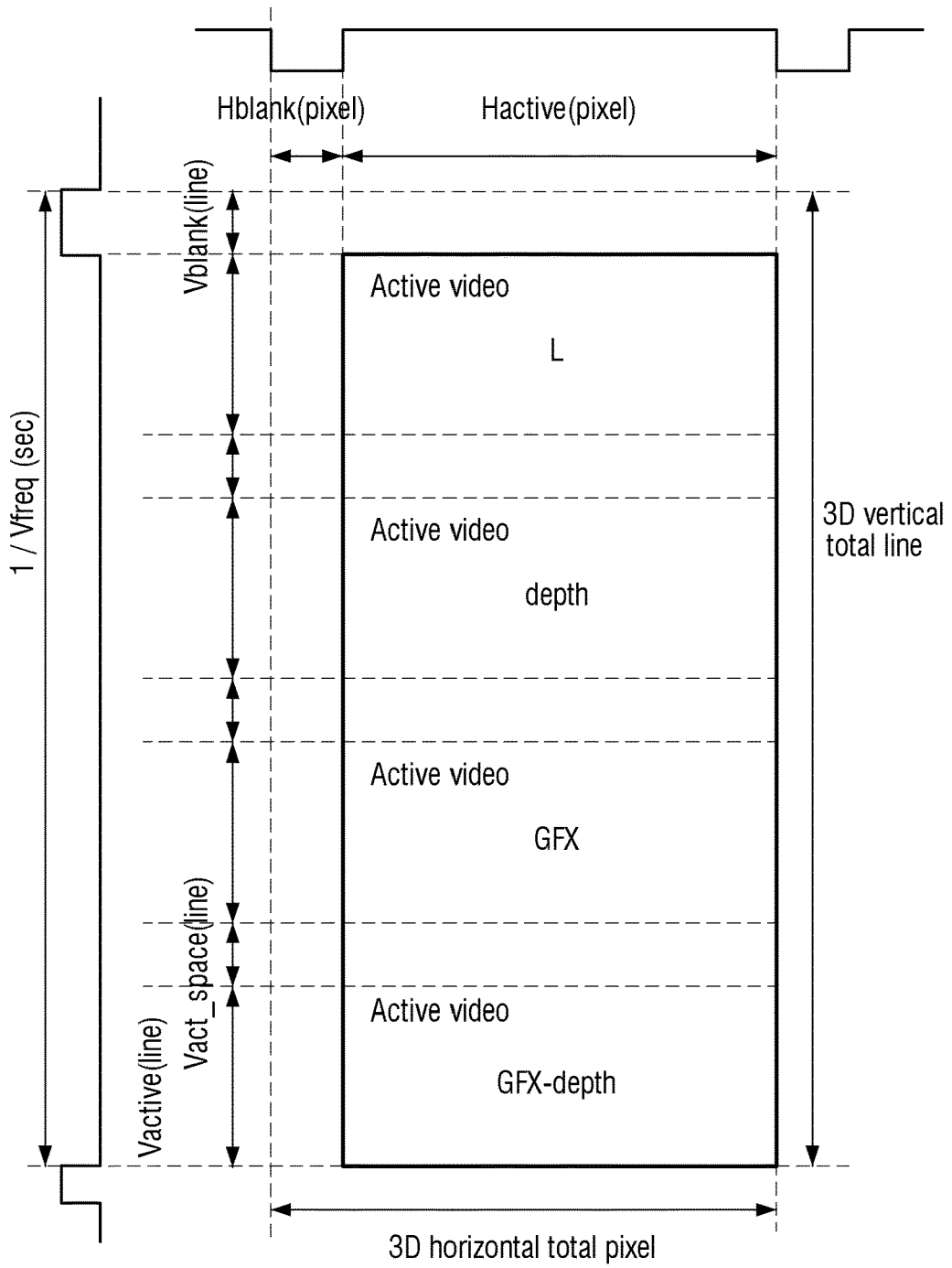
Figure 18C:
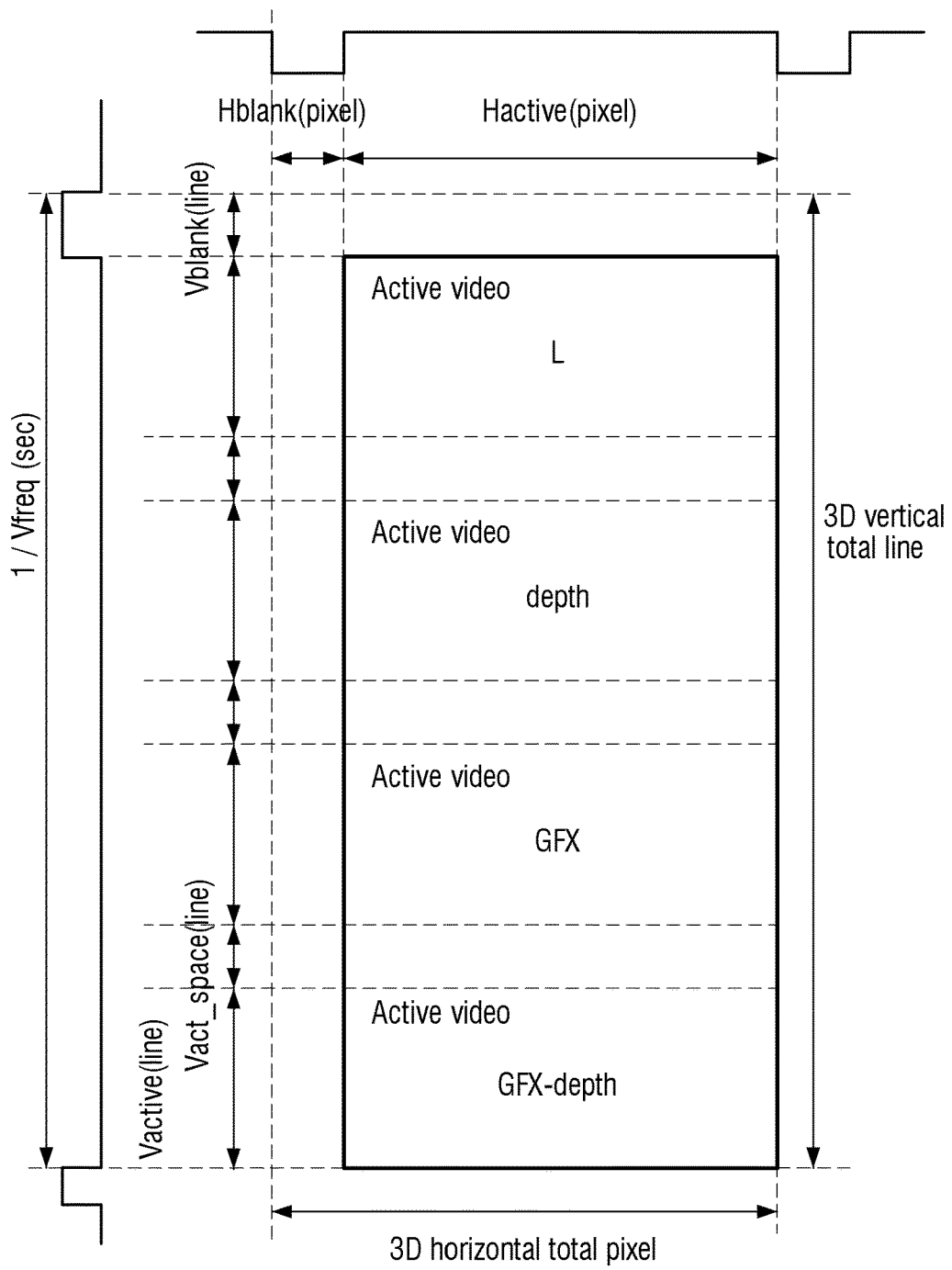

FIGS. 18A, 18B and 18C illustrate various data transmitting formats for transmitting quad view video content in a 3D interlace format.

A vendor-specific Info Frame and a vendor-specific data block may be modified by extending a conventional field to define a 3D multi-view to a reserved area.

TABLE 57

| | VSIF (Packet Body) | | | | | | | |
|---|---|---|---|---|---|---|---|---|
| Byte # | 7 | 6 | 5 | 4 | 3 | 2 | 1 | 0 |
| PB0 | | | | | Checksum | | | |
| PB1 | | | | | IEEE Registration Identifier(C4-5D-D8) | | | |
| PB2 | | | | | (third octet(D8) first) | | | |

TABLE 57-continued

| | VSIF (Packet Body) | | | | | | | |
|---|---|---|---|---|---|---|---|---|
| Byte # | 7 | 6 | 5 | 4 | 3 | 2 | 1 | 0 |
| PB3 | | | | | | | | |
| PB4 | HDMI_F_Video_Format | | | 3D_Valid | Rsvd(0) | Rsvd(0) | Rsvd(0) | Y420 |
| PB5 | | | | | Extended_VIC | | | |
| (PB6) | | | | If (3D_Valid is set(=1)) then | | | | |
| | | 3D_F_Structure | | | 3D_Additional-Info_present | 3D_Disparity-Data_present | 3D_Meta_present | Rsvd(0) |
| (PB7) | | | | If (3D_Valid is set(=1)) then | | | | |
| | | 3D_F_Ext_Data | | | | | | Rsvd(0) |
| (PB8) | | | | If (3D_AddtionalInfo_present set(=1)) then | | | | |
| | Rsvd(0) | Rsvd(0) | Rsvd(0) | 3D_DualView | 3D_ViewDependancy | | 3D_Preferred2DView | |
| ... | | | | ... | | | | |

TABLE 58

NUM_VIEWS(Rsvd + 3D_DualView)

| NUM_VIEWS | | Description |
|---|---|---|
| 0 | 0 | Reserved |
| 0 | 1 | Dual-view |
| 1 | 0 | Triple-view |
| 1 | 1 | Quad-view |

TABLE 59

| | VSDB | | | | | | | |
|---|---|---|---|---|---|---|---|---|
| Byte # | 7 | 6 | 5 | 4 | 3 | 2 | 1 | 0 |
| 0 | Vendor-specific tag code(=3) | | | | | Length(=n) | | |
| 1 | IEEE Registration Identifier(C4-5D-D8) | | | | | | | |
| 2 | (third octet(D8) first) | | | | | | | |
| 3 | | | | | | | | |
| 4 | Max_TMDS_Character_Clock | | | | | | | |
| 5 | HDMI_F_VIC_LEN(M) | | | F_3D_present | | Y420_present | Dual_View | Rsvd(0) |
| ... | | | | ... | | | | |

Data transceiving methods are now described according to various exemplary embodiments.

Figure 19:
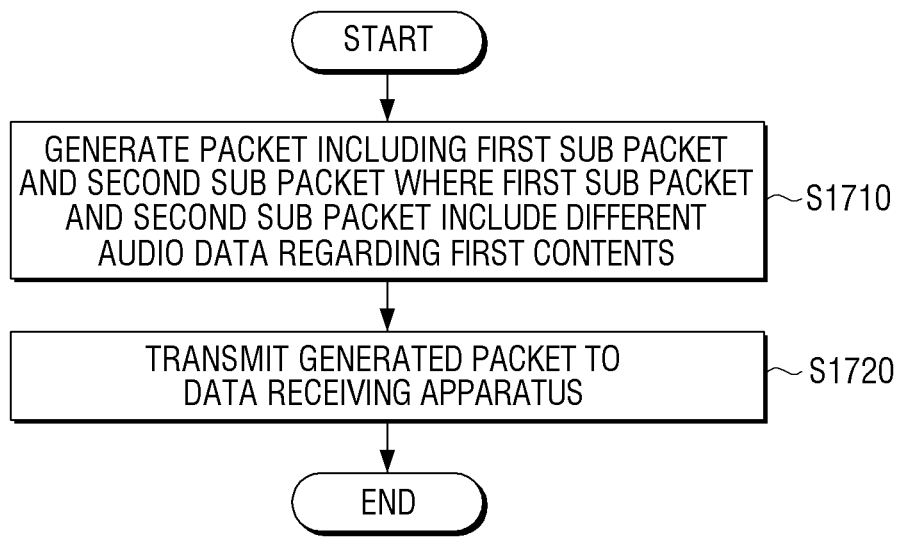
FIG. 19 is a flowchart of a data transmitting method according to an exemplary embodiment.

FIG. 19 is a flowchart of a data transmitting method according to an exemplary embodiment.

Referring to FIG. 19, a data transmitting method according to an exemplary embodiment includes generating a packet including a first sub packet and a second sub packet (S1710) and transmitting the generated packet to a data receiving apparatus (S1720). The first sub packet and the second sub packet include different audio data related to a first content.

The first sub packet may include audio data for a non-disabled person, and the second sub packet may include audio data for a visually impaired person.

The first sub packet and the second sub packet may include audio data in different languages.

The first sub packet may include audio data corresponding to an audio description with respect to the second sub packet.

The packet may further include a third sub packet including audio data with respect to a second content which is different from the first content.

The audio data included in the first sub packet may be audio data exclusively provided for the first content, the audio data included in the third sub packet may be audio data exclusively provided for the second content, and the audio data included in the second sub packet may be common audio data with respect to the first content and the second content.

In addition, the packet may further include a fourth sub packet including audio data with respect to the second content, and the third sub packet and the fourth sub packet may include different audio data.

Figure 20:
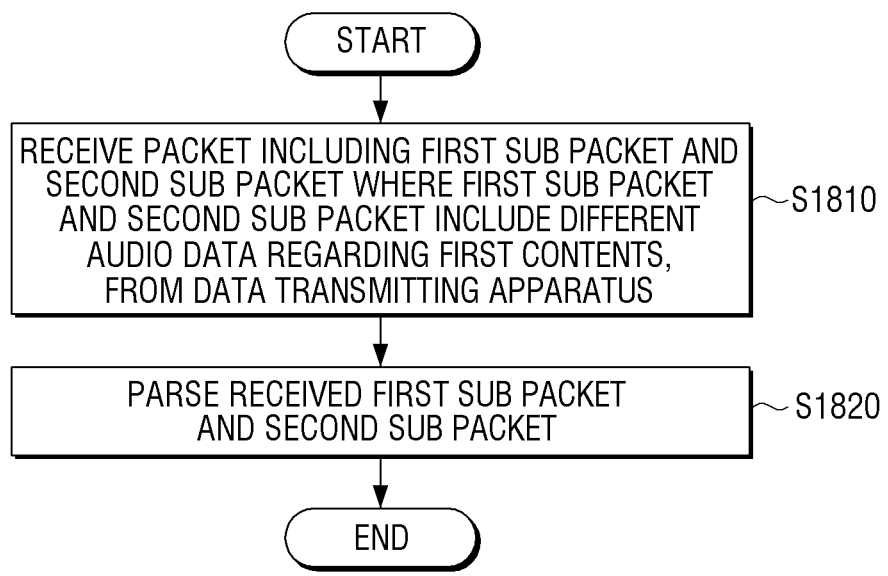
FIG. 20 is a flowchart of a data receiving method according to an exemplary embodiment.

FIG. 20 is a flowchart of a data receiving method according to an exemplary embodiment.

Referring to FIG. 20, a data receiving method according to an exemplary embodiment includes receiving a packet including the first sub packet and the second sub packet from the data transmitting apparatus (S1810) and parsing the received first sub packet and second sub packet (S1820). The first sub packet and the second sub packet include different audio data related to the first content.

The first sub packet may include audio data for a non-disabled person, and the second sub packet may include audio data for a visually impaired person.

The first sub packet and the second sub packet may include audio data in different languages.

The first sub packet may include audio data corresponding to an audio description with respect to the second sub packet.

The packet may further include a third sub packet including audio data with respect to the second content which are different from the first content.

The audio data included in the first sub packet may be audio data exclusively provided for the first content, the audio data included in the third sub packet may be audio data exclusively provided for the second content, and the audio data included in the second sub packet may be common audio data with respect to the first content and the second content.

In addition, the packet may further include a fourth sub packet including audio data with respect to the second content, and the third sub packet and the fourth sub packet may include different audio data.

Figure 21:
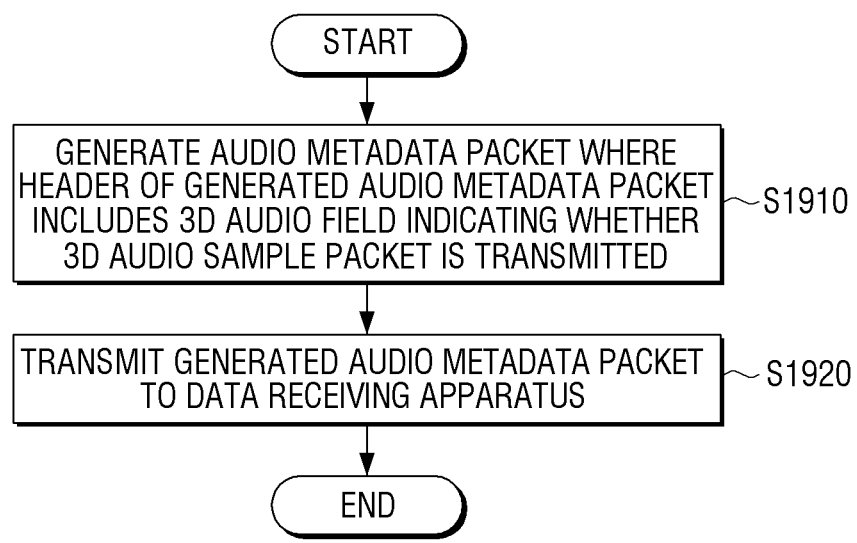
FIG. 21 is a flowchart of a data transmitting method according to another exemplary embodiment.

FIG. 21 is a flowchart of a data transmitting method according to another exemplary embodiment.

Referring to FIG. 21, a data transmitting method according to the exemplary embodiment includes generating an audio metadata packet (S1910), and transmitting a header of the generated audio metadata packet to the data receiving apparatus (S1920). The header of the generated audio metadata packet may include a 3D audio field indicating whether a 3D audio sample packet is transmitted.

In addition, the header of the generated audio metadata packet may further include an audio stream number field (Number Of Audio Stream Field) providing information about the number of transmitted audio streams.

The header of the generated audio metadata packet may further include a view number field (Number Of Views Field) providing information about the number of different transmitted contents.

A payload of the generated audio metadata packet may include an audio metadata descriptor field including metadata regarding a sub packet of a multi-stream audio sample packet or a multi-stream one bit audio sample packet.

The audio metadata descriptor field includes at least one of an emergency channel field indicating whether there is an emergency broadcasting, a multi-view field indicating whether audio data corresponding to a left-eye image or a right-eye image is included in a multi-view, a language code valid field indicating whether a language of audio data is identified, a supplemental audio valid field indicating whether there is supplemental audio data, a pre-mixed supplemental audio field indicating whether a main audio data and the supplemental audio data are pre-mixed, a supplemental audio type field indicating a type of the supplemental audio data, and a language code field indicating a language code of audio data.

Figure 22:
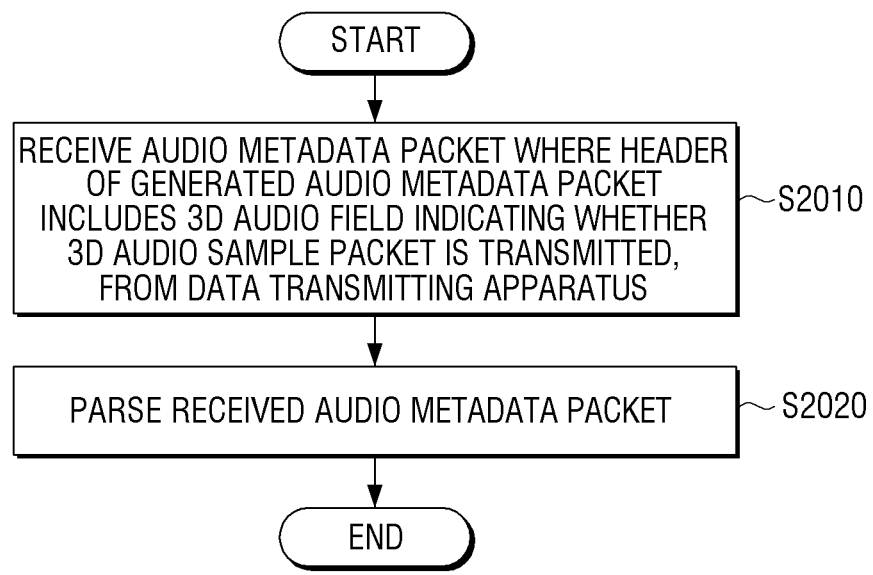
FIG. 22 is a flowchart of a data receiving method according to another exemplary embodiment.

FIG. 22 is a flowchart of a data receiving method according to another exemplary embodiment.

Referring to FIG. 22, a data receiving method according to the exemplary embodiment includes receiving an audio metadata packet from a data transmitting apparatus (S2010), and parsing the received audio metadata packet (S2020). A header of the generated audio metadata packet includes a 3D audio field indicating whether a 3D audio sample packet is transmitted.

The header of the generated audio metadata packet may further include an audio stream number field (Number Of Audio Stream Field) providing information about the number of transmitted audio streams.

The header of the generated audio metadata packet may further include a view number field (Number Of Views Field) providing information about the number of different transmitted contents.

A payload of the generated audio metadata packet may include an audio metadata descriptor field including metadata regarding a sub packet of a multi-stream audio sample packet or a multi-stream one bit audio sample packet.

The audio metadata descriptor field includes at least one of an emergency channel field indicating whether there is an emergency broadcasting, a multi-view field indicating whether audio data corresponding to a left-eye image or a right-eye image is included in a multi-view, a language code valid field indicating whether a language of audio data is identified, a supplemental audio valid field indicating whether there is supplemental audio data, a pre-mixed supplemental audio field indicating whether a main audio data and the supplemental audio data are pre-mixed, a supplemental audio type field indicating a type of the supplemental audio data, and a language code field indicating a language code of audio data.

Figure 23:
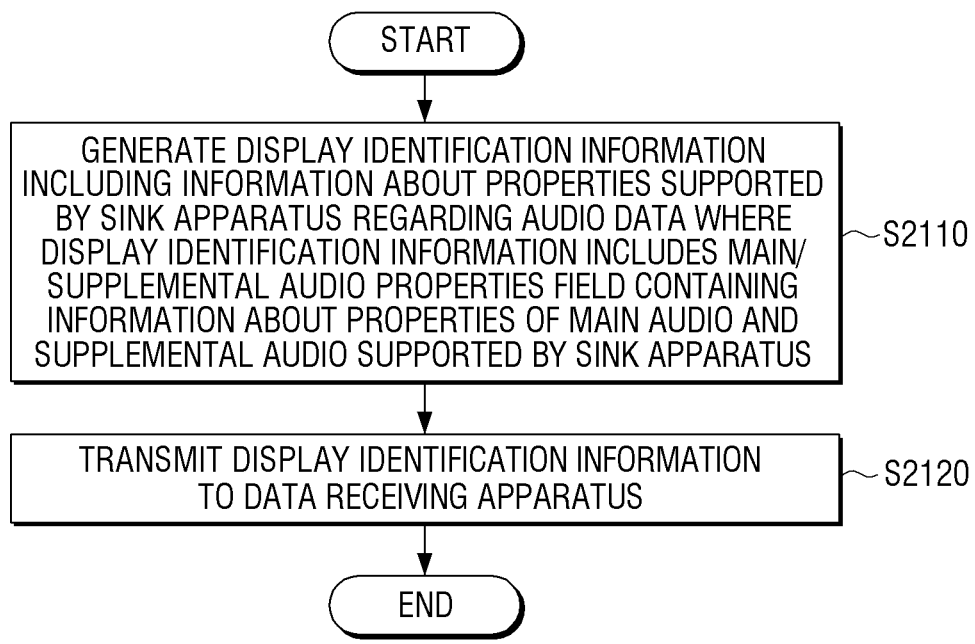
FIG. 23 is a flowchart of a data transmitting method according to another exemplary embodiment.

FIG. 23 is a flowchart of a data transmitting method according to another exemplary embodiment.

Referring to FIG. 23, a data transmitting method according to the exemplary embodiment includes generating display identification information including information on properties supported by a sink apparatus with respect to audio data (S2110) and transmitting the display identification information to a data receiving apparatus (S2120). The display identification information includes a main/supplemental audio properties field providing information about properties of main audio and supplemental audio supported by the sink apparatus.

The main/audio properties field includes at least one of an audio mix field indicating whether the sink apparatus supports composition of main audio and supplemental audio, a supplemental audio support field indicating whether the sink apparatus supports supplemental audio, a language support field indicating whether the sink apparatus supports audio data in a plurality of languages, a multi-view audio support field indicating whether the sink apparatus supports multi-stream audio data for a multi-view content, a maximum stream count field indicating a number of maximum audio streams which is handled by the sink apparatus, and an audio descriptor number field indicating a number of 3D audio descriptors.

The display identification information may further include an emergency channel field indicating whether the sink apparatus supports receiving and processing of emergency broadcasting.

Figure 24:
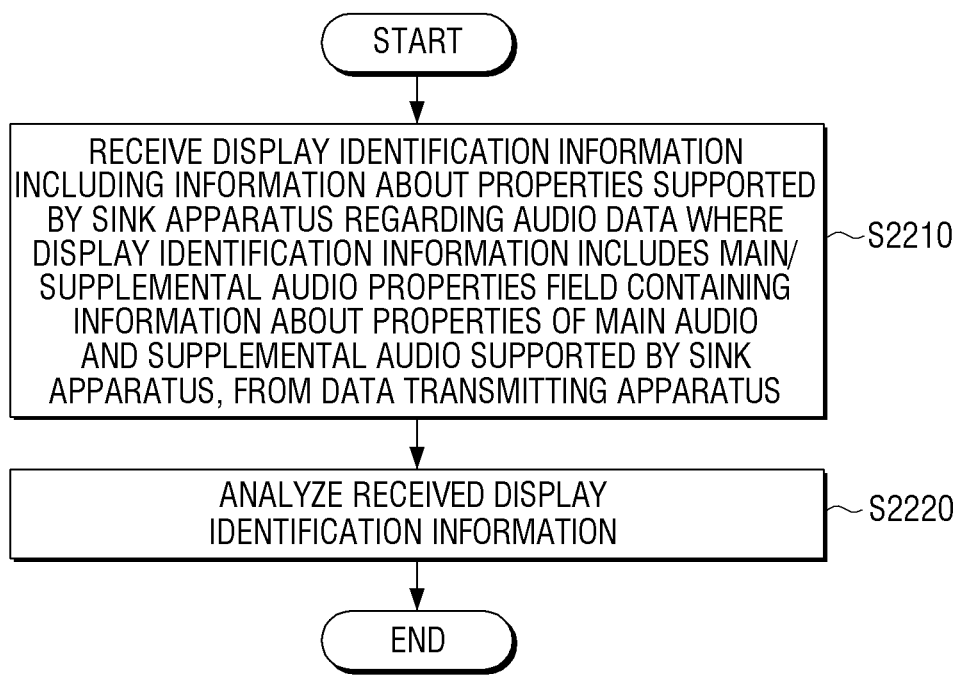
FIG. 24 is a flowchart of a data receiving method according to another exemplary embodiment.

FIG. 24 is a flowchart of a data receiving method according to another exemplary embodiment.

Referring to FIG. 24, a data receiving method according to the exemplary embodiment includes receiving display identification information including information on properties supported by a sink apparatus with respect to audio data (S2210) and analyzing the received display identification information (S2220). The display identification information includes a main/supplemental audio properties field indicating information on properties of main audio and supplemental audio supported by the sink apparatus.

The main/audio properties field includes at least one of an audio mix field indicating whether the sink apparatus supports a composition of main audio and supplemental audio, a supplemental audio support field indicating whether the sink apparatus supports supplemental audio, a language support field indicating whether the sink apparatus supports audio data in a plurality of languages, a multi-view audio support field indicating whether the sink apparatus supports multi-stream audio data for a multi-view content, a maximum stream count field indicating a number of maximum audio streams which is handled by the sink apparatus, and an audio descriptor number field indicating a number of 3D audio descriptors.

The display identification information may further include an emergency channel field indicating whether the sink apparatus supports receiving and processing of emergency broadcasting.

Although some exemplary embodiments have been shown and described, exemplary embodiments are not limited thereto. It would be appreciated by those skilled in the art that changes may be made in these exemplary embodiments without departing from the principles and spirit of the disclosure, the scope of which is defined in the claims and their equivalents.

What is claimed is:

1. A data transmitting apparatus comprising:
a processor configured to generate a packet including a plurality of sub packets associated with audio data; and
a transmitter configured to transmit a signal comprising the generated packet,
wherein the generated packet comprises an audio type information field, in a packet payload, comprising a supplemental audio type present field and a supplemental audio type field, the supplemental audio type present field indicating whether there is supplemental audio of the audio data,
wherein, when the supplemental audio type present field is set to a first predefined value, the audio type information field includes the supplemental audio type field, the supplemental audio type field indicating a supplemental audio type for the audio data included in each of the plurality of sub packets, and
wherein, when the supplemental audio type present field is set to a second predefined value, the supplemental audio type field is ignored,
wherein the audio type information field further comprises a one-bit mixed audio field and a one-bit valid language code field, the one-bit mixed audio field indicating whether main audio data and supplemental audio data are pre-mixed and the one-bit valid language code field indicating whether there is a valid language of the audio data, and
wherein, when the one-bit mixed audio field is set to a first predetermined value, the audio data includes a pre-mixed stream of main audio and the supplemental audio and when the one-bit valid language code field is set to a second predetermined value, the audio data includes a language code field.

2. The data transmitting apparatus as claimed in claim 1, wherein a first sub packet from among the plurality of sub packets comprises audio data for a non-disabled person, and a second sub packet from among the plurality of sub packets comprises audio data for a visually or hearing impaired person.

3. The data transmitting apparatus as claimed in claim 2, wherein the first sub packet and the second sub packet comprise audio data in different languages.

4. The data transmitting apparatus as claimed in claim 2, wherein the first sub packet comprises audio data corresponding to an audio description related to the second sub packet.

5. The data transmitting apparatus as claimed in claim 2, wherein a third sub packet from among the plurality of sub packets comprises audio data related to a second content which is different from a first content.

6. The data transmitting apparatus as claimed in claim 5, wherein audio data of the first sub packet comprises audio data exclusively provided for the first content, wherein the audio data of the third sub packet comprises audio data exclusively provided for the second content, and wherein the audio data of the second sub packet comprises audio data which is commonly used for the first content and for the second content.

7. The data transmitting apparatus as claimed in claim 5, wherein the packet further includes a fourth sub packet comprising audio data related to the second content, and wherein the third sub packet and the fourth sub packet comprise different audio data.

8. The data transmitting apparatus of claim 1, wherein the supplemental audio comprises at least one from among narrated audio for a visually impaired person, spoken subtitles for the visually impaired person, or clean audio for a hearing impaired person.

9. The data transmitting apparatus of claim 1, wherein when the one-bit mixed audio field is set to a second predetermined value, the one-bit mixed audio field indicates that the audio data includes a stream of the main audio mixed separately from the supplemental audio.

10. A data receiving apparatus comprising:
a receiver configured to receive a signal comprising a packet including a plurality of sub packets associated with audio data; and
a processor configured to parse the received plurality of sub packets,
wherein the received packet comprises an audio type information field, in a packet payload, comprising a supplemental audio type present field and a supplemental audio type field, the supplemental audio type present field indicating whether there is supplemental audio of the audio data,
wherein, when the supplemental audio type present field is set to a first predefined value, the audio type information field includes the supplemental audio type field, the supplemental audio type field indicating a supplemental audio type for the audio data included in each of the plurality of sub packets, and
wherein, when the supplemental audio type present field is set to a second predefined value, the supplemental audio type field is ignored,
wherein the audio type information field further comprises a one-bit mixed audio field and a one-bit valid language code field, the one-bit mixed audio field indicating whether main audio data and supplemental audio data are pre-mixed and the one-bit valid language code field indicating whether there is a valid language of the audio data, and
wherein, when the one-bit mixed audio field is set to a first predetermined value, the audio data includes a pre-mixed stream of main audio and the supplemental audio and when the one-bit valid language code field is set to a second predetermined value, the audio data includes a language code field.

11. The data receiving apparatus as claimed in claim 10, wherein a first sub packet from among the plurality of sub packets comprises audio data for a non-disabled person, and a second sub packet from among the plurality of sub packets comprises audio data for a visually impaired person or a hearing impaired person.

12. The data receiving apparatus as claimed in claim 11, wherein the first sub packet and the second sub packet comprises audio data in different languages.

13. The data receiving apparatus as claimed in claim 11, wherein the first sub packet comprises audio data corresponding to an audio description related to the second sub packet.

14. The data receiving apparatus as claimed in claim 11, wherein a third sub packet from among the plurality of sub packets comprises audio data related to a second content which is different from a first content.

15. The data receiving apparatus as claimed in claim 14, wherein audio data of the first sub packet comprises audio data exclusively provided for the first content,
wherein audio data of the third sub packet comprises audio data exclusively provided for the second content, and
wherein audio data of the second sub packet comprises audio data which is commonly used for the first content and the second content.

16. The data receiving apparatus as claimed in claim 14, wherein the packet further comprises a fourth sub packet comprising audio data related to the second content, and
wherein the third sub packet and the fourth sub packet comprise different audio data.

17. A data transceiving system comprising:
a data receiving apparatus; and
a data transmitting apparatus configured to generate a packet comprising a plurality of sub packets associated with audio data and transmit a signal comprising the generated packet to the data receiving apparatus; and
wherein the data receiving apparatus is configured to receive the signal comprising the packet from the data transmitting apparatus,
wherein the generated packet comprises an audio type information field, in a packet payload, comprising a supplemental audio type present field and a supplemental audio type field, the supplemental audio type present field indicating whether there is supplemental audio of the audio data,
wherein, when the supplemental audio type present field is set to a first predefined value, the audio type information field includes the supplemental audio type field, the supplemental audio type field indicating a supplemental audio type for the audio data included in each of the plurality of sub packets, and
wherein, when the supplemental audio type present field is set to a second predefined value, the supplemental audio type field is ignored,
wherein the audio type information field further comprises a one-bit mixed audio field and a one-bit valid language code field, the one-bit mixed audio field indicating whether a main audio data and supplemental audio data are pre-mixed and the one-bit valid language code field indicating whether there is a valid language of the audio data, and
wherein, when the one-bit mixed audio field is set to a first predetermined value, the audio data includes a pre-mixed stream of main audio and the supplemental audio and when the one-bit valid language code field is set to a second predetermined value, the audio data includes a language code field.

18. A data transmitting method comprising:
generating a packet comprising a plurality of sub packets associated with audio data; and
transmitting a signal comprising the generated packet to a data receiving apparatus,
wherein the generated packet comprises an audio type information field, in a packet payload, comprising a supplemental audio type present field and a supplemental audio type field, the supplemental audio type present field indicating whether there is supplemental audio of the audio data,
wherein, when the supplemental audio type present field is set to a first predefined value, the audio type information field includes the supplemental audio type field, the supplemental audio type field indicating a supplemental audio type for the audio data included in each of the plurality of sub packets, and
wherein, when the supplemental audio type present field is set to a second predefined value, the supplemental audio type field is ignored,
wherein the audio type information field further comprises a one-bit mixed audio field and a one-bit valid language code field, the one-bit mixed audio field indicating whether main audio data and supplemental audio data are pre-mixed and the one-bit valid language code field indicating whether there is a valid language of the audio data, and
wherein, when the one-bit mixed audio field is set to a first predetermined value, the audio data includes a pre-mixed stream of main audio and the supplemental audio and when the one-bit valid language code field is set to a second predetermined value, the audio data includes a language code field.

19. A data receiving method comprising:
receiving a signal comprising a packet including a first sub packet and a second sub packet associated with audio data; and
parsing the received first sub packet and second sub packet,
wherein the received packet comprises an audio type information field, in a packet payload, comprising a supplemental audio type present field and a supplemental audio type field, the supplemental audio type present field indicating whether there is supplemental audio of the audio data,
wherein, when the supplemental audio type present field is set to a first predefined value, the audio type information field includes the supplemental audio type field, the supplemental audio type field indicating a supplemental audio type for the audio data included in each of the first sub packet and second sub packet, and
wherein, when the supplemental audio type present field is set to a second predefined value, the supplemental audio type field is ignored,
wherein the audio type information field further comprises a one-bit mixed audio field and a one-bit valid language code field, the one-bit mixed audio field indicating whether main audio data and supplemental audio data are pre-mixed and the one-bit valid language code field indicating whether there is a valid language of the audio data, and
wherein, when the one-bit mixed audio field is set to a first predetermined value, the audio data includes a pre-mixed stream of main audio and the supplemental audio and when the one-bit valid language code field is set to a second predetermined value, the audio data includes a language code field.

* * * * *